(12) United States Patent
Li et al.

(10) Patent No.: US 11,774,635 B2
(45) Date of Patent: Oct. 3, 2023

(54) ACHROMATIC MULTI-ZONE METALENS

(71) Applicant: PRESIDENT AND FELLOWS OF HARVARD COLLEGE, Cambridge, MA (US)

(72) Inventors: Zhaoyi Li, Cambridge, MA (US); Yao-Wei Huang, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 288 days.

(21) Appl. No.: 17/184,326

(22) Filed: Feb. 24, 2021

(65) Prior Publication Data

US 2021/0263190 A1    Aug. 26, 2021

Related U.S. Application Data

(60) Provisional application No. 62/981,478, filed on Feb. 25, 2020.

(51) Int. Cl.
*G02B 1/00*  (2006.01)

(52) U.S. Cl.
CPC ........ *G02B 1/002* (2013.01); *G02B 2207/101* (2013.01)

(58) Field of Classification Search
CPC ..... G02B 2207/101; G02B 1/002; G02B 1/00
USPC ......................................................... 359/722
See application file for complete search history.

(56) References Cited

U.S. PATENT DOCUMENTS

| | | | |
|---|---|---|---|
| 10,690,809 B2 * | 6/2020 | Kamali | G02B 5/0808 |
| 2012/0328240 A1 * | 12/2012 | Ma | H01Q 15/0086 |
| | | | 385/33 |
| 2018/0197052 A1 * | 7/2018 | Yanson | G06K 19/06037 |
| 2020/0025975 A1 * | 1/2020 | Kamali | G02B 1/02 |
| 2021/0356754 A1 * | 11/2021 | Li | G02B 27/4211 |
| 2022/0214479 A1 * | 7/2022 | Sell | G02B 5/188 |

OTHER PUBLICATIONS

Yoon, G., Jang, J., Mun, J. et al. Metasurface zone plate for light manipulation in vectorial regime. Commun Phys 2, 156 (2019). https://doi.org/10.1038/s42005-019-0258-x (Year: 2019).*

* cited by examiner

*Primary Examiner* — William R Alexander
(74) *Attorney, Agent, or Firm* — FOLEY & LARDNER LLP

(57) ABSTRACT

An optical device includes a first zone including a first plurality of nanoscale elements. The first plurality of nanoscale elements has a first optical dispersion profile and a first orientation. The optical device has a second zone including a second plurality of nanoscale elements. The second plurality of nanoscale elements has a second optical dispersion profile and a second orientation. The first orientation and the second orientation are configured according to constructive interference for a plurality of wavelengths and a focal length.

19 Claims, 28 Drawing Sheets

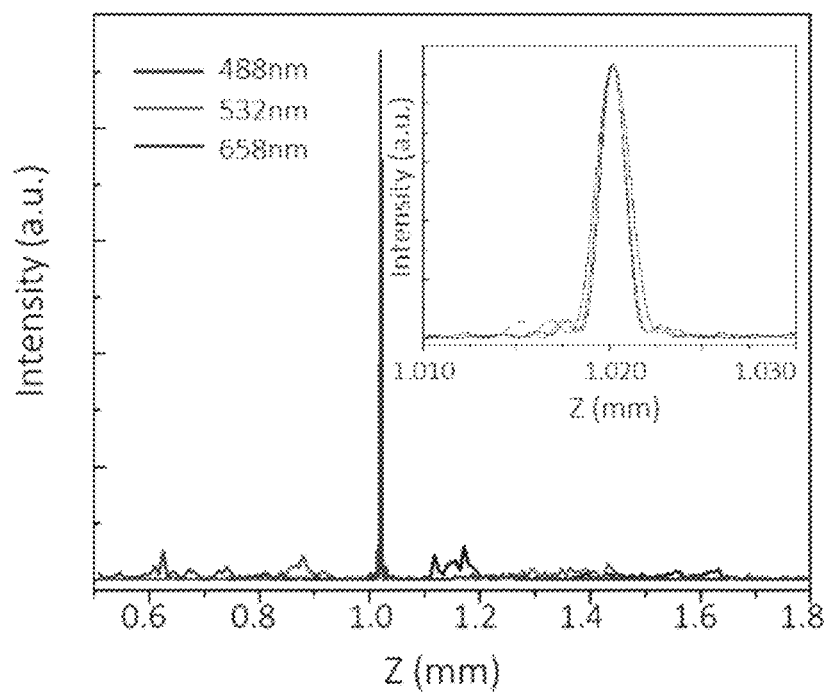
FIG. 2D
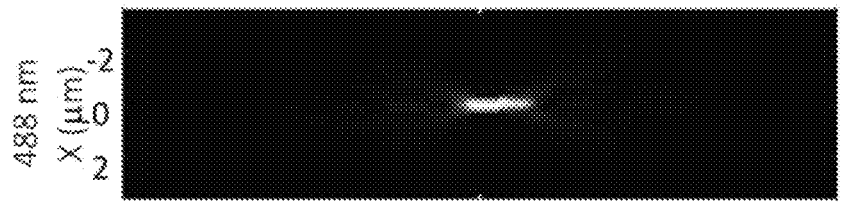
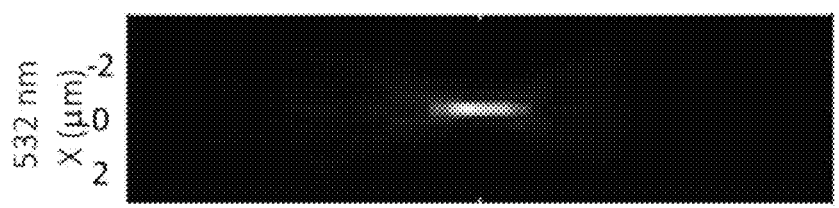
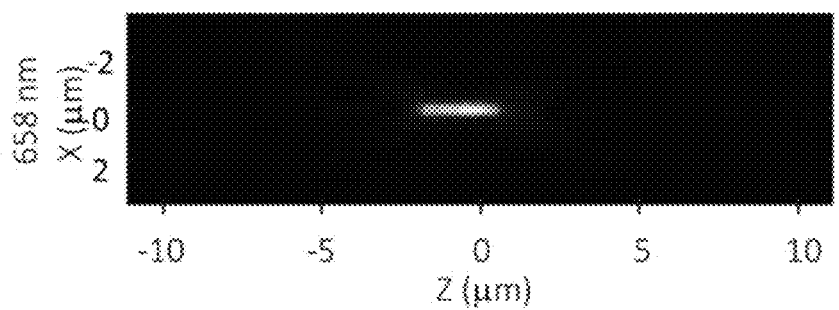
FIG. 2E

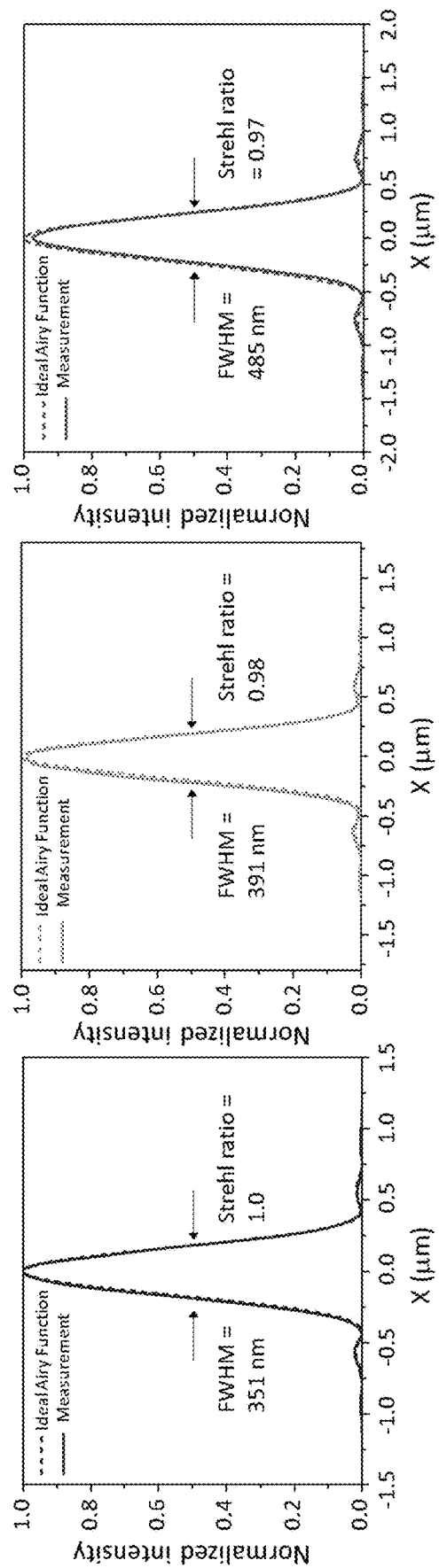

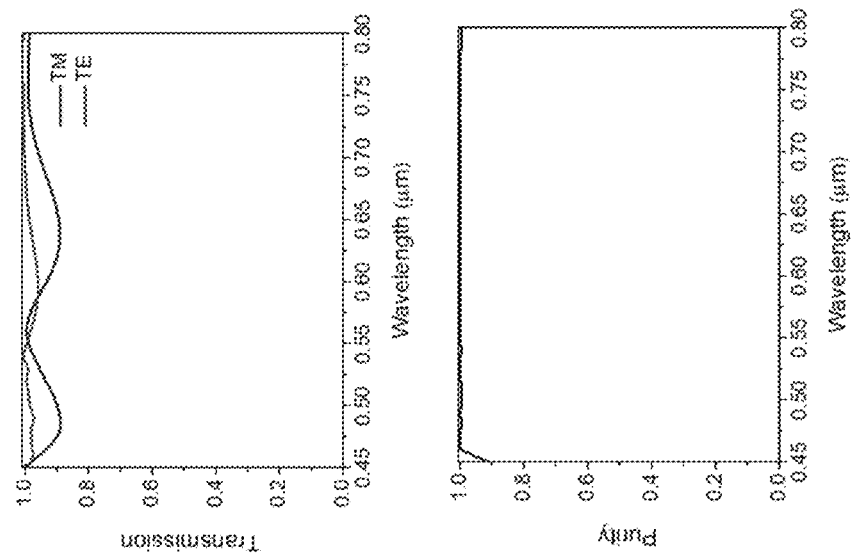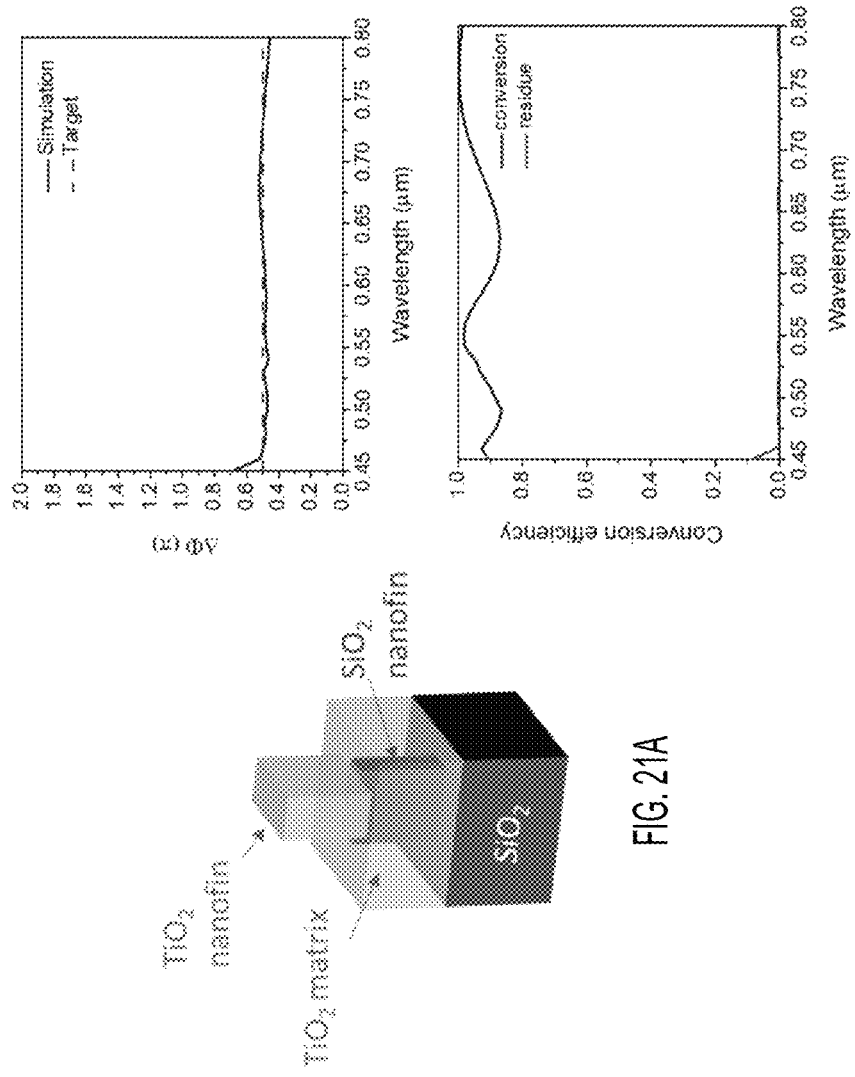

ACHROMATIC MULTI-ZONE METALENS

CROSS-REFERENCE TO RELATED PATENT APPLICATIONS

This application claims the benefit and priority of U.S. Provisional Patent Application No. 62/981,478, filed on Feb. 25, 2020, the entirety of which is incorporated by reference herein.

GOVERNMENT FUNDING

This invention was made with government support under HR0011-18-1-0001 awarded by the U.S. Department of Defense/DARPA. The U.S. government has certain rights in the invention.

BACKGROUND

Virtual reality (VR) and augmented reality (AR) have evolved from science-fiction concepts into influential technologies that change lives in various ways. Virtual reality is a technology that creates an immersive experience by replacing reality with an imaginary world, and augmented reality aims to blend virtual- with real-world scenes. Current virtual reality and augmented reality devices suffer from large form factor and poor imaging quality due to the bottlenecks imposed by optics.

SUMMARY

A meta-optics-based compact virtual reality and augmented reality system that produces full-color, high-resolution virtual-reality images and integrates virtual objects with real-world scenes, respectively, is disclosed. To realize that, 2-mm diameter, thin metalenses with different numerical apertures that are capable of diffraction-limited achromatic focusing of blue, green, and red wavelengths by applying dispersion engineering and zone interference engineering design principles are demonstrated. The metalenses can correct monochromatic aberrations and chromatic aberration for normal incidence.

One aspect of the present disclosure is directed to an optical device. The optical device includes a first zone including a first plurality of nanoscale elements. The first plurality of nanoscale elements has a first optical dispersion profile and a first orientation. The optical device has a second zone including a second plurality of nanoscale elements. The second plurality of nanoscale elements has a second optical dispersion profile and a second orientation. The first orientation and the second orientation are configured according to constructive interference for a plurality of wavelengths and a focal length.

Another aspect of the present disclosure is directed to a method of manufacturing an optical device. The method includes disposing a first plurality of nanoscale elements in a first zone. The first plurality of nanoscale elements has a first optical dispersion profile and a first orientation. The method includes disposing a second plurality of nanoscale elements in a second zone. The second plurality of nanoscale elements has a second optical dispersion profile and a second orientation. The method includes determining the first orientation and the second orientation based on constructive interference for a plurality of wavelengths and a focal length.

Another aspect of the present disclosure is directed to an augmented reality device. The augmented reality device includes a first zone. The first zone includes a first plurality of nanoscale elements. The first plurality of nanoscale elements has a first optical dispersion profile and a first orientation. The augmented reality device includes a second zone. The second zone includes a second plurality of nanoscale elements. The second plurality of nanoscale elements has a second optical dispersion profile and a second orientation. The augmented reality device includes a waveguide for transmitting augmented reality information to the first zone and the second zone. The first orientation and the second orientation are determined based on constructive interference for a plurality of wavelengths and a focal length.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 2A-2K illustrate a design, fabrication, and simulations of an RGB-achromatic metalens, according to an embodiment.

FIGS. 7A-7C illustrate measured Strehl ratios of a metalens with NA=0.7, according to an embodiment.

FIGS. 21A-21E illustrate simulations of a metasurface-based achromatic quarter waveplate (QWP), according to an embodiment.

Like reference numbers and designations in the various drawings indicate like elements.

DETAILED DESCRIPTION

Figure 1:
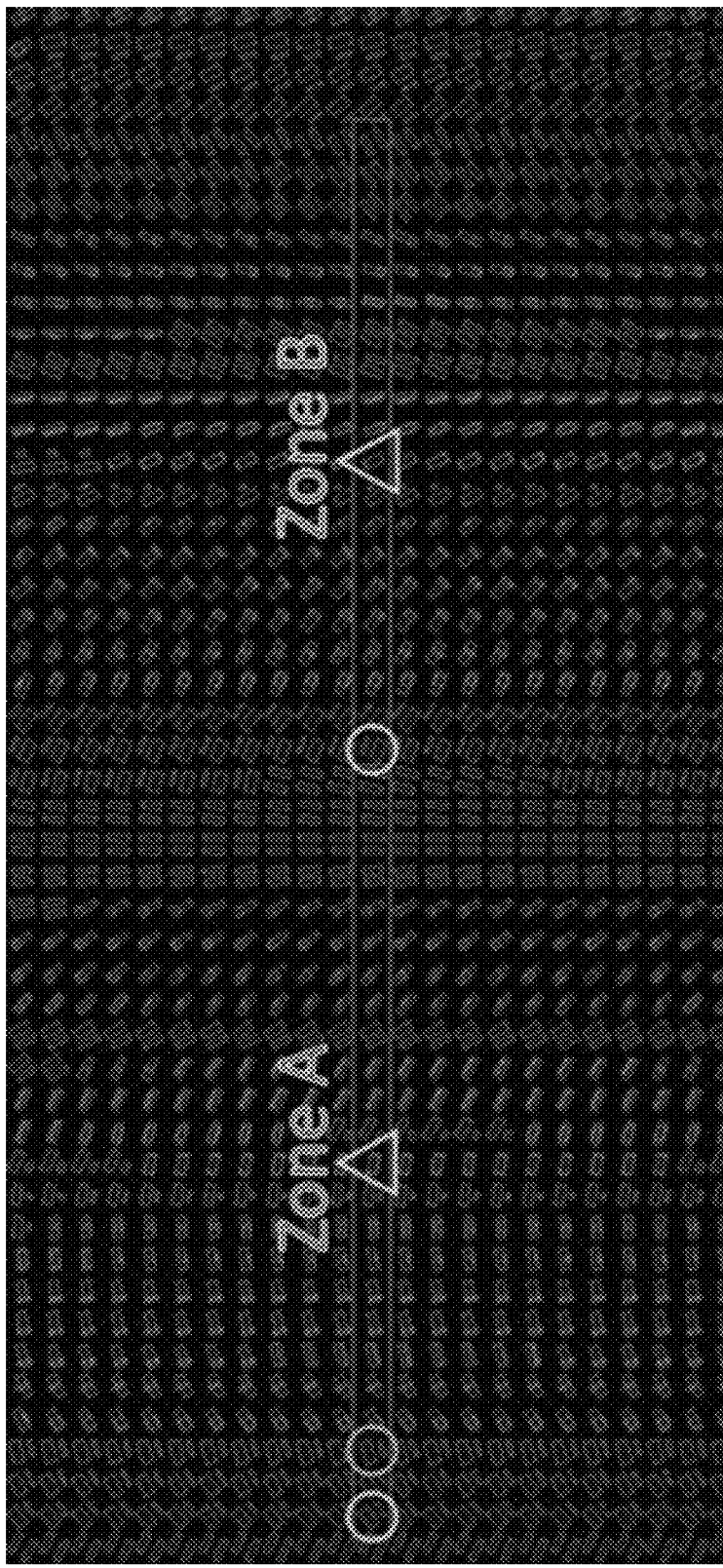
FIG. 1 illustrates two zones of a metasurface, according to an embodiment.

Breakthroughs in VR and AR technologies have attracted attention from the scientific community as well as industry, and have also stimulated interests of the general public. However, the widespread use of VR/AR devices is hindered by the development of optical elements such as lenses. Unlike electronics that continuously reduce in size following Moore's law, the form factor of optical elements has hardly changed. As a result, the current VR/AR devices are bulky, heavy, and hard to wear. Moreover, a compound lens and freeform optics that are commonly seen in commercial products design and research prototypes further increase device footprint, complexity, cost, and fabrication difficulties. Chromatic aberration from poor-quality lenses is another issue that compromises viewing experience especially in the VR devices where only singlet lenses are used. Besides challenges in the optical architecture, a desirable VR/AR display that has small pixel size, wide color gamut, and high brightness is still under exploration.

As discussed herein, metasurfaces can be a platform for novel flat optics. Metasurfaces are arrays of manufactured nanostructures assembled on a subwavelength scale that can mold incident electromagnetic wavefronts. Metalenses, in particular, can address the challenges of conventional optics. Fundamentally different from classic lenses, a metalens is optically thin and light. A metalens can control the phase, amplitude and polarization state of incident light with sub-wavelength resolution. High numerical aperture (NA) can be achieved in metalenses. Metalenses can work in the visible band and can operate over broad bandwidth by locally engineering waveguide modes of meta-atoms to compensate material dispersion. Large-scale chromatic metalenses can be mass-produced via CMOS-compatible fabrication techniques. The unique merits of metalenses can address the challenges of current VR/AR systems.

A large RGB-achromatic metalens and a compact VR/AR system based on the RGB-achromatic metalens is disclosed. One common issue of conventional optical lenses is chromatic aberration. The chromatic aberration of a refractive lens originates from the intrinsic material dispersion that causes longer wavelengths to focus at longer focal distance. In comparison, the focusing of a diffractive lens (e.g., Fresnel lens) is more than ten times as dispersive. Such severe chromaticity can be due to phase discontinuities at zone boundaries and results in longer focal distances for shorter wavelengths. The metalens can correct refractive and diffractive type of chromatic aberration by dispersion engineering and zone interference engineering, respectively. To compensate material dispersion, the effective refractive index of the metalens can be spatially engineered by employing meta-atoms that can independently control phase and dispersion (e.g., group delay, group delay dispersion, etc.). A phase profile can include a representation (e.g., graphic, plot, relationship) of a phase of a periodic function of a variable. A dispersion profile can include a representation (e.g., graphic, plot, relationship) of dispersion (e.g., group delay, group delay dispersion, etc.). However, such an approach may limit the diameter of the metalens to tens of microns for NA of 0.1-0.2 because the maximum group delay is approximately proportional to the product of lens diameter and NA.

To overcome the size limit, the metalens can be extended from a dispersion-engineered single-zone configuration to a multi-zone configuration. A zone of a metalens/metasurface is defined as an area (e.g., region or distribution of nanoscale elements) without repeated dispersive behavior. FIG. 1 illustrates two zones of a metasurface. For example, the two zones are labeled along a radial direction corresponding to Zone A and Zone B. Each zone can include a plurality of nanoscale elements (e.g., nanoscale structures, meta structures, meta items, etc.). Nanoscale elements within the same zone may have different shapes, the same shapes, and/or repeated shapes. Nanoscale elements within the same zone may have the same degree of rotation or different degrees of rotation (e.g., relative to each other or to a reference). For example, a first nanoscale element of the first plurality of nanoscale elements can have a 10° rotation, a second nanoscale element of the first plurality of nanoscale elements can have a 20° rotation, and a third nanoscale element of the first plurality of nanoscale elements can have a 30° rotation.

Figure 2A:
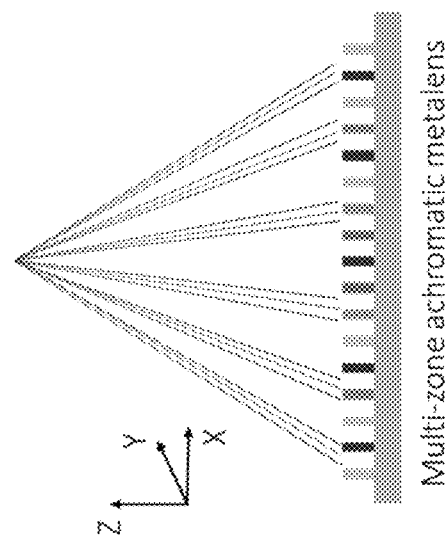
Figure 2B:
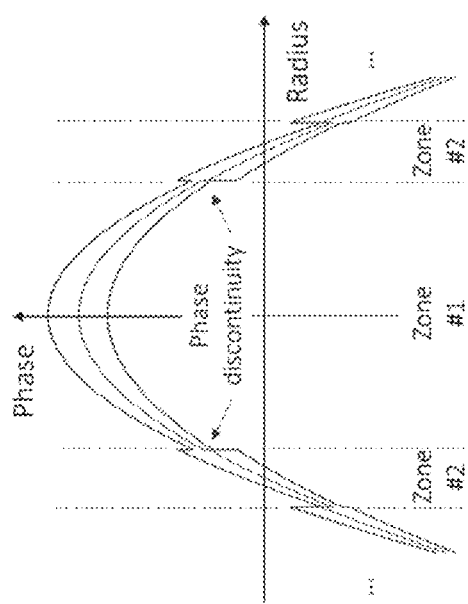

FIG. 2A is a schematic representation of a multi-zone RGB-achromatic metalens showing achromatic focusing of RGB light coming from different zones. Furthermore, zone transition locations and the phase discontinuities at zone boundaries can be optimized to achieve achromatic focusing of design wavelengths, as shown in FIG. 2B. FIG. 2B is a schematic representation of phase profiles in different zones at design wavelengths. The phase profiles within each zone and the phase discontinuities at zone boundaries are optimized for achromatic focusing. Two 2 mm-diameter metalenses with NA of 0.7 and 0.3 are disclosed to achieve focusing of three primary RGB colors at the same focal length while suppressing spurious focal spots elsewhere along optical axes. There is no limit in metalens size by using this design approach.

In one example embodiment, a metalens with NA=0.7 consists of 681 zones. Each individual zone can be designed for achromatic focusing of the visible light ranging from 470 nm to 670 nm, and the group delay of meta-atoms in each zone may be bounded by 2 fs and 4 fs. The phase discontinuities at zone boundaries can be optimized to focus design wavelengths of 488 nm, 532 nm, and 658 nm at equal focal length. This metalens can focus incident light of left-handed circular polarization and can convert it to right-handed circularly polarized light. The simulation of the intensity distribution of three wavelengths along the optical axis by using the Fresnel-Kirchhoff integral method shows pronounced focusing peaks at the design focal length with negligible intensity elsewhere, as shown in FIG. 2D. FIG. 2D illustrates a focusing intensity distribution of a metalens with NA=0.7 along its optical axis at design wavelengths of 488 nm, 532 nm, and 658 nm. The inset is a zoomed-in view showing the same focal length at the design wavelengths. FIGS. 2F-2H illustrate simulated intensity profiles of focal spots at three design wavelengths in a plane perpendicular to the optical axis (Z-axis). The calculated Strehl ratios are all close to unity indicating diffraction-limited focusing.

In one example embodiment, a metalens with NA=0.3 is optimized not only for the phase discontinuities at zone boundaries, but also for the zone transition locations as well as the RGB wavelengths so that the constructive interference of light at design wavelengths only occurs at the focal length. The calculated Strehl ratios are close to unity and the intensity of spurious focal spots is greatly suppressed.

Figure 2C:
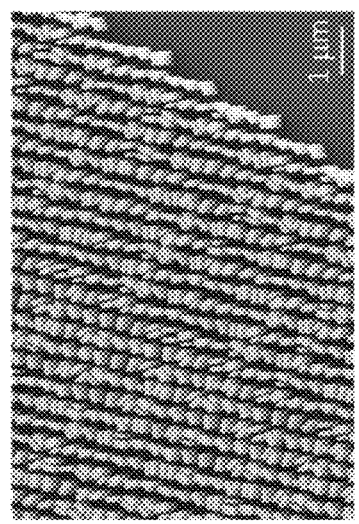
Figure 2F:
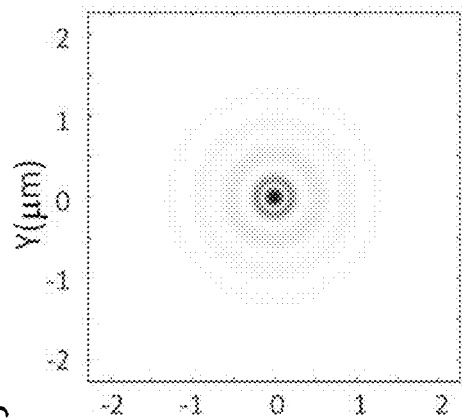
Figure 2G:
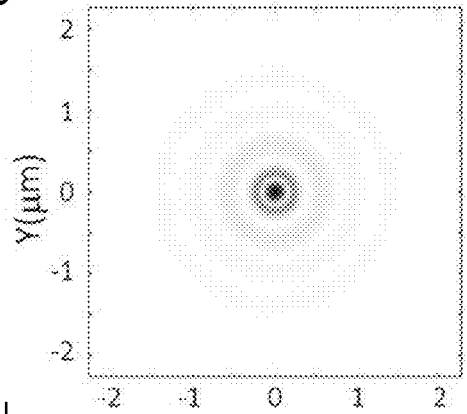
Figure 2H:
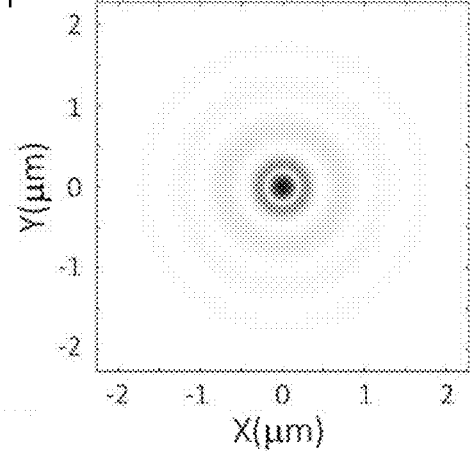
Figure 2I:
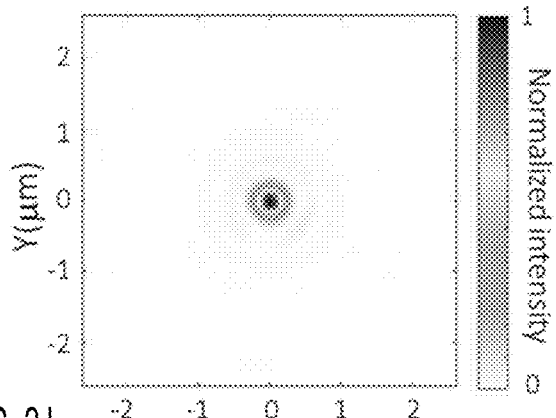
Figure 2J:
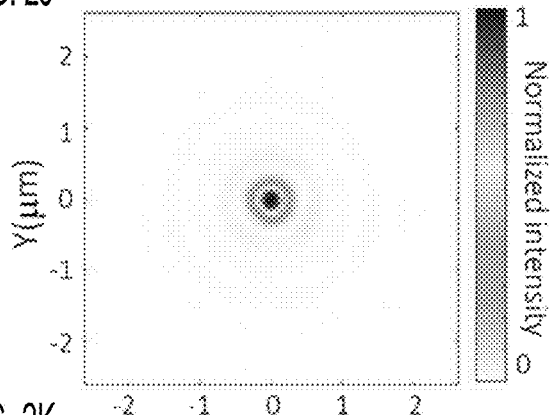
Figure 2K:
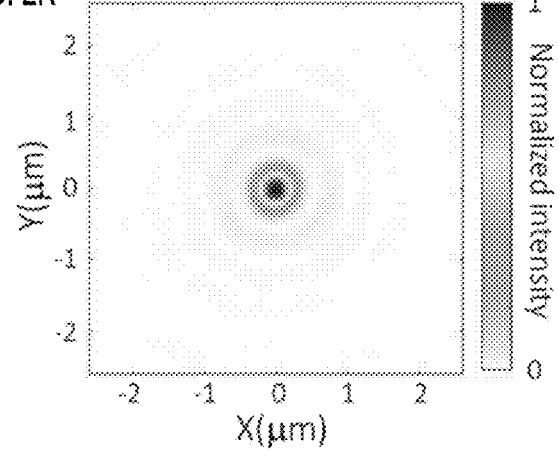

FIG. 2C shows a scanning electron microscope image of a fabricated NA=0.7 metalens. The scale bar is 1 µm. The metalens may be composed of $TiO_2$ nanofins of different geometries and rotation angles that are tailored for independent control of phases and dispersion. FIG. 2E shows the measured focal intensity profile in the XZ plane of the metalens at the design wavelengths. Additionally, measured focal intensity distribution of the metalens in the XZ plane showing negligible focal shift (~0.1% of the focal length) at the design wavelengths is shown. The maximum focal shift among three focal spots at the RGB wavelengths is around 1 µm, which is ~0.1% of the design focal length. The error arises from fabrication imperfections. FIGS. 2I-2K illustrate measured intensity distributions in the focal plane and the corresponding Strehl ratios at the design wavelengths are all close to unity. Such focusing is the result of the combined effects of dispersion engineering and zone interference engineering. The RGB focusing of the metalens with NA=0.3 is similarly achromatic and diffraction-limited.

Figure 3:
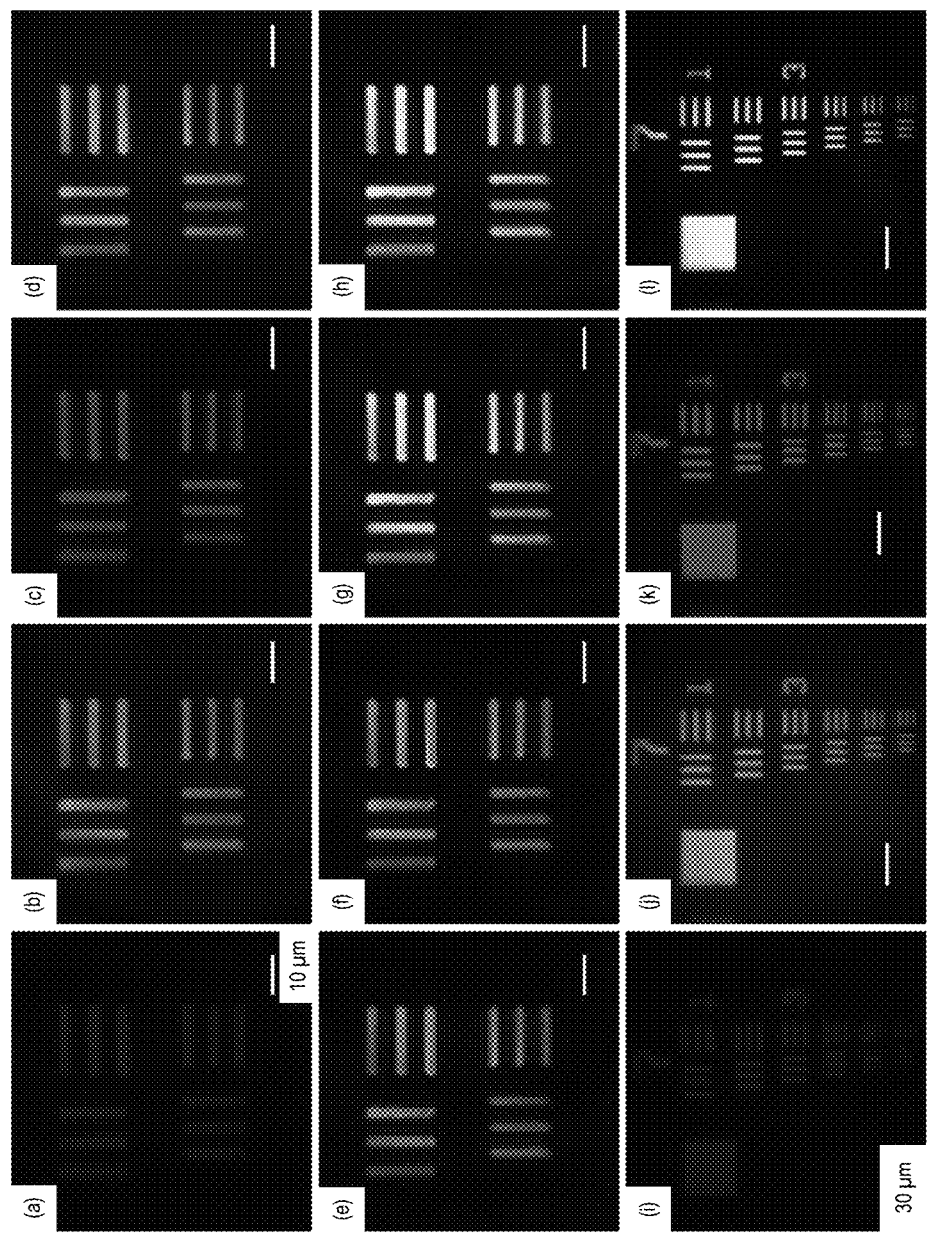
FIG. 3 illustrates imaging of a resolution target by RGB achromatic metalenses under different illuminations, according to an embodiment.

Imaging of the metalens is characterized by using a resolution target. For the metalens with NA=0.7, elements No. 5 and No. 6 from group No. 7 were imaged using diode lasers with linewidths <1 nm as shown in FIG. 3, parts A-C. The smallest feature size is ~2.2 µm. The metalens not only resolves each bar but also captures the subtle features of the imperfection of the bar shape at the edges. The slight blur at the bar edges is due to coma aberration. The imaging of this metalens was also tested in other synthesized colors by mixing two incident light sources as seen in FIG. 3, parts D-G. FIG. 3, parts G and H, illustrate imaging results under white light illumination synthesized by combining RGB diode lasers. A metalens with NA=0.3 was characterized by imaging the whole group No. 7 of the resolution target. A tunable supercontinuum laser with linewidth of 5 nm was used as a light source, and results are shown in FIG. 3, parts I-K. FIG. 3 part L shows the white light imaging result by combining RGB laser sources. The coma aberration of this metalens is less pronounced due to its smaller NA. Imaging blur was observed by the increasing light source bandwidth.

A meta-optics-based system for VR/AR applications can include an RGB doublet metalens that can also correct for coma aberration for oblique incident beams. The meta-optics-based system for VR/AR applications can include a centimeter scale metalens for larger field of view. The centimeter scale metalens can be achieved by employing the fabrication techniques that are feasible for large scale and mass production at low cost. For example, fabrication techniques can include i-line stepper lithography (365 nm), KrF deep-UV stepper lithography (248 nm), ArF deep-UV immersion lithography (193 nm), and nanoimprint lithography for large metalens fabrication. The meta-optics-based system for VR/AR applications can include reducing the tilted angle of the beamsplitter combiner by applying volume holographic films that can change the angle of the reflected beam and can also function as an exit pupil expander. Alternatively, a thin metasurface layer can be designed and applied that can mold the wavefront of the reflected beam at will. The footprint of the fiber scanning display could be reduced towards a portable device. The metalens can include $TiO_2$ nanofin structures. The building block library was built up by using rigorous coupled-wave analysis (RCWA) method and consists of ~60K nanostructures with different geometries. The height of the $TiO_2$ nanofin is 600 nm and the periodicity of the unit cell is 400 nm, in this example embodiment. The incident light is set as left-handed circularly polarized and the monitored transmitted light is in the conjugate right-handed circularly polarization state.

The metalens presented can be fabricated on fused silica substrate in the following procedures. The fused silica substrate can be spin-coated with a layer of 600-nm thick positive electron beam resist (EBR, Zeon Chemicals, ZEP-520A) followed by an additional layer of conductive polymer (Showa Denko, ESPACER 300) to avoid charging effects during electron beam lithography. After that, the patterns can be defined using electron beam lithography (Elionix, ELS-F125) and the exposed sample was then developed in o-xylene. Next, around 210-nm thick amorphous $TiO_2$ can be deposited directly onto the developed sample using atomic layer deposition (Cambridge Nanotech, Savannah). The $TiO_2$ not only filled in the trenches of the exposed e-beam resist, but can also be coated on top of the unexposed sample area. The excess film of the $TiO_2$ can be removed by using reactive ion etching (Oxford Instrument, PlasmaPro 100 Cobra 300) and the etchant can be a mixture of $CHF_3$, $O_2$ and Ar gas. Upon the completion of the etching processing, the electron-beam resist can be stripped off by soaking the sample in Remover PG (MicroChem Corporation) for 24 hours.

One challenge of metalens design is to overcome chromatic dispersion. An achromatic metalens can be implemented in the visible range by using the dispersion engineering method. However, this design method and other methods can limit the metalens size to tens of microns. An underlying reason is that the phase profile for an achromatic metalens can follow:

$$\varphi(r, \omega) = -\frac{\omega}{c}\left(\sqrt{r^2 + F^2} - F\right) \quad (1)$$

where r, ω, c, F are the metalens radius, angular frequency, the speed of light, metalens design focal length, respectively. The group delay (GD) that is defined by ∂φ/∂ω increases as function of radius. The GD can be engineered by tailoring the nanostructure geometry and is proportional to the height of meta-atoms. The maximum GD for an achromatic metalens may be given by:

$$\left|\frac{\partial \varphi}{\partial \omega}\right| = \frac{NA \times R}{2c} \quad (2)$$

where NA and R are the numerical aperture and the radius, respectively, of a metalens, and φ, ω, c is defined the same as above. The maximum achievable GD determines the product of the numerical aperture and the radius of a metalens. For example, the maximum GD range by employing a 600-nm-tall $TiO_2$ nanofin is ~4 fs, and it implies the maximum diameter is ~40 µm for a metalens with NA=0.2. Such kind of a metalens has only one zone, and unit cells are not reused. The physics as stated in Equation 2 can impose a bottleneck to scale up an achromatic metalens. To overcome the size limit, the metalens can be extended from a single-zone configuration to a multi-zone configuration.

Figures 4A, 4B, 4C:
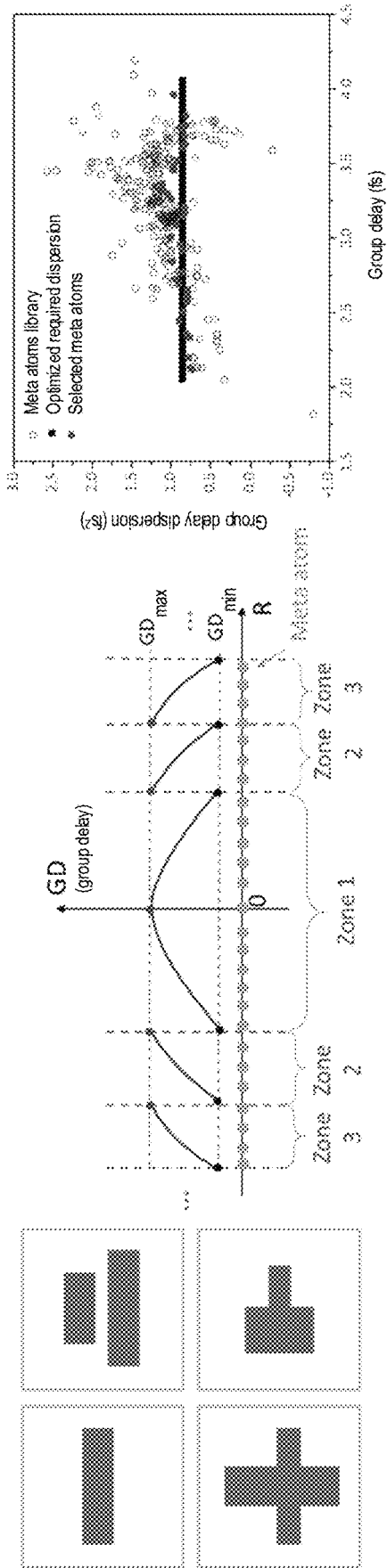
FIGS. 4A-4C illustrate design principles of dispersion engineering and zone interface engineering, according to an embodiment.

An example of a multi-zone configuration lens is the Fresnel lens. However, the Fresnel lens suffers from severe chromatic aberration. The reason is that the Fresnel lens is designed by wrapping the phase profile at design wavelength from 0 to $2\pi$ a in each zone. At design wavelength there are no phase discontinuities at zone boundaries, and light focus at design focal length. However, phase discontinuities appear at zone boundaries for other wavelengths. As a result, the constructive interference of light at other wavelengths occurs elsewhere along the optical axis and causes focal length shifts. The shorter wavelength focuses at longer focal length. The metalens of the present disclosure solves the chromatic aberration by engineering dispersion and zone interference according to one or more of the following steps:

(1) A meta atom library based on $TiO_2$ nanofins for example, may be built and used. The unit cell can have a fixed periodicity of 400 nm. The height of the $TiO_2$ nanofins can be fixed to be 600 nm, and their shapes can vary in form. FIG. 4A shows four examples of unit cells of a single-bar shape, a double-bar shape, a crossbar shape and a T-bar shape. Examples of different meta-atoms with unit cell periodicity of 400 nm are shown. The meta-atom can be made of $TiO_2$, and the height of the $TiO_2$ meta-atom can be fixed to be 600 nm.

(2) The phase, the group delay (GD), and the group delay dispersion (GDD) of the meta-atoms library can be calculated. FIG. 4B shows the GD-GDD dispersion map of an example library used to design a metalens with NA=0.7. The schematic of group delay (GD) profile as a function of metalens radius is shown. The GD wraps from $GD_{max}$ to $GD_{min}$ in each zone. Each blue circle corresponds to a unit cell. A conversion efficiency filter can be added to select (e.g., determine, identify, etc.) 708 qualified unit cells so that the minimum efficiency is larger than 50% at wavelengths of 480 nm, 530 nm, and 650 nm. The maximum GD range in this example library is fs.

(3) Instead of wrapping the phase profile at design wavelength from 0 to a in each zone, the metalens can be designed by wrapping GD (FIG. 4B) from a maximum value to a minimum value that is confined by a meta-atoms library. Each zone may be defined as a metalens region without repeatable dispersion (GD, GDD, etc.). Within each zone, the phase profile can follow Equation 1, which can also define the GD and GDD profiles.

(4) According to Equation 1, the GD and GDD at the metalens center should be zero, which cannot be fulfilled by the meta-atoms library. However, an offset of the GD-GDD dispersion curve at the metalens center does not affect focusing. The desired offset can be determined by using a particle swarm optimization method. For example, In FIG. 4C, the black squares indicate the optimized GD-GDD dispersion relation from the metalens center to the edge in steps of 400 nm. The GD and GDD of the unit cell residing in the metalens center are 4.06 fs and 0.86 $fs^2$, respectively. The red dots correspond to the chosen unit cells to assemble the metalens according to the GD-GDD relation curve, which have minimized wavefront errors. FIG. 4C shows a group delay (GD) vs group delay dispersion (GDD) map of a meta-atoms library. The black squares are the optimized dispersion relation for the metalens with NA=0.7, and the red dots correspond to the chosen meta-atoms to assemble the metalens.

(5) The phase discontinuities of the center design wavelength at zone boundaries can be optimized, which refer to the phase differences between the red and black dots as shown in FIG. 4C, by using a gradient-based optimization method. To physically implement that, the phase and the dispersion profile can be independently controlled. More specifically, the meta-atoms in each zone can be rotated (e.g., collectively), which shifts the phase profile without changing the GD profile. As a result, the design wavelengths, for example RGB wavelengths, all constructively interfere at the design focal length and thus achromatically focus.

Figure 5A:
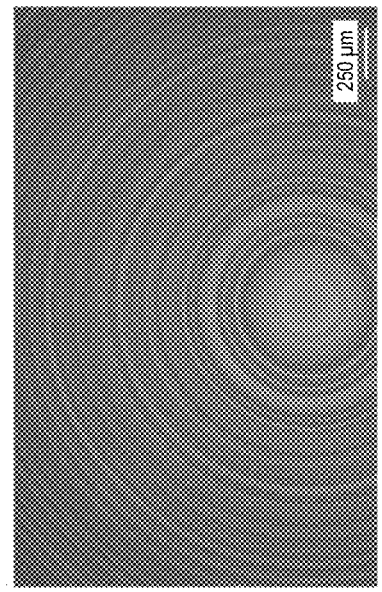
FIGS. 5A-5C illustrate optical microscope image and scanning microscope images of a metalens, according to an embodiment.
Figure 5B:
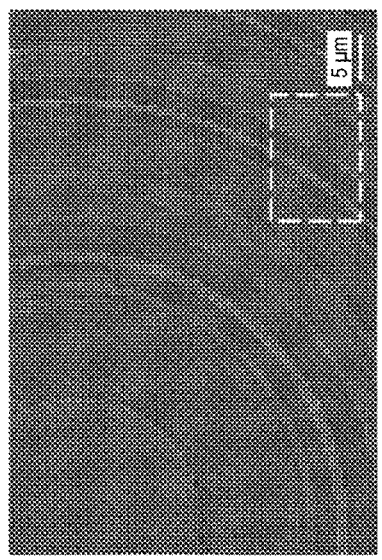
Figure 5C:
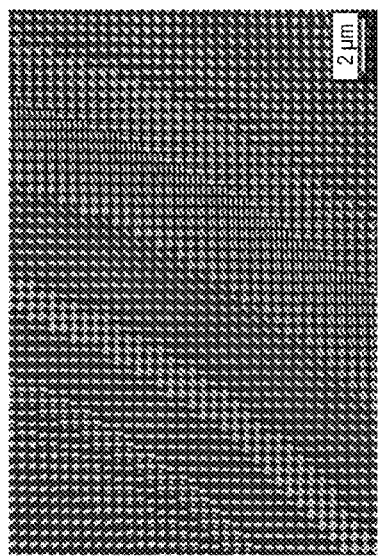

FIGS. 5A-7C illustrate optical microscope image and scanning microscope images of a metalens. FIG. 5A shows an optical microscope image of the metalens with NA=0.7, which shows the center part of the metalens. The scale bar is 250 µm. FIG. 5B shows a scanning electron microscope (SEM) image of the center part of the metalens. The scale bar is 5 µm. FIG. 5B shows a zoomed-in SEM image of the region as marked with the dashed outline as shown in FIG. 5B. The scale bar is 2 µm.

Figure 6:
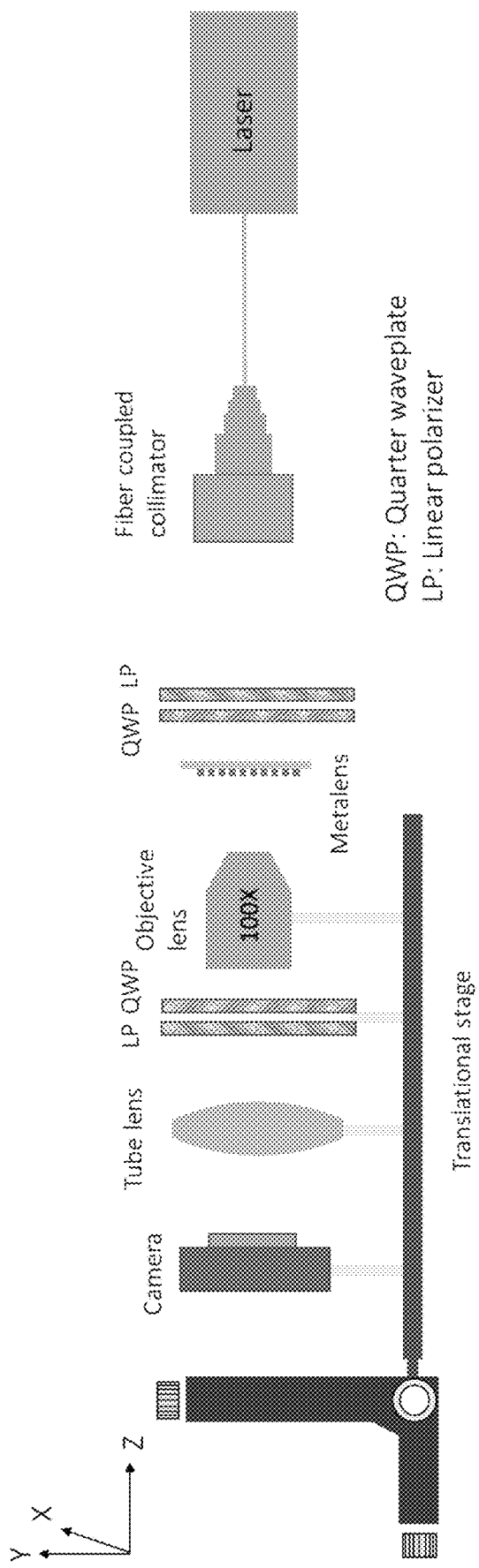
FIG. 6 illustrates a schematic of an optical setup to measure focusing intensity distribution of a metalens in three-dimensional space, according to an embodiment.

FIG. 6 illustrates a schematic of the optical setup to measure focusing intensity distribution of a metalens in three-dimensional space. The light source used is a SuperK supercontinuum fiber-coupled laser (NKT, EXTREME and VARIA). The incident beam from the laser can be collimated by a fiber coupled collimator (Thorlabs, RC12APC-P01). The collimated laser beam can pass through a wire grid polarizer (Thorlabs, WP25M-VIS), followed by an achromatic quarter waveplate (Thorlabs, AQWP05M-600), to generate the left-handed circularly polarized light. The left-handed circularly polarized normal incident light can be focused by the metalens. The focal spot can be imaged by a home-built microscopy system, which, for instance, consists of an Olympus objective (100× magnification, NA=0.9) and a tube lens with focal length f=180 mm (Thorlabs, TTL180-A). Another pair of wire grid polarizer and quarter waveplate can be placed in between the tube lens and the objective to select the conjugate right-handed circularly polarized output beam. The focal profile of the metalens can be recorded by a CMOS camera (Thorlabs, DCC1545M).

FIGS. 7A-7C illustrate the measured Strehl ratios of a metalens with NA=0.7. FIG. 7A shows a solid line representing the measured focusing intensity of the metalens with NA=0.7 at design wavelength $\lambda$=488 nm. $\lambda$ is along radial direction at the focal plane. In comparison, the dashed line is the corresponding theoretical Airy function profile. The solid line and the dashed line agree with each other. The measured full width half maximum (FWHM) is 351 nm and the calculated Strehl ratio is ~1.0. FIG. 7B shows a comparison between the measured focusing intensity profile in radial line cut with the theoretical Airy function at wavelength $\lambda$=532 nm. The measured FWHM is 391 nm and the calculated Strehl ratio is 0.98. FIG. 7C shows a comparison between the measured focusing intensity profile in radial line cut with the theoretical Airy function at wavelength $\lambda$=658 nm. The measured FWHM is 485 nm and the calculated Strehl ratio is 0.97.

Figures 8A, 8B, 8C:
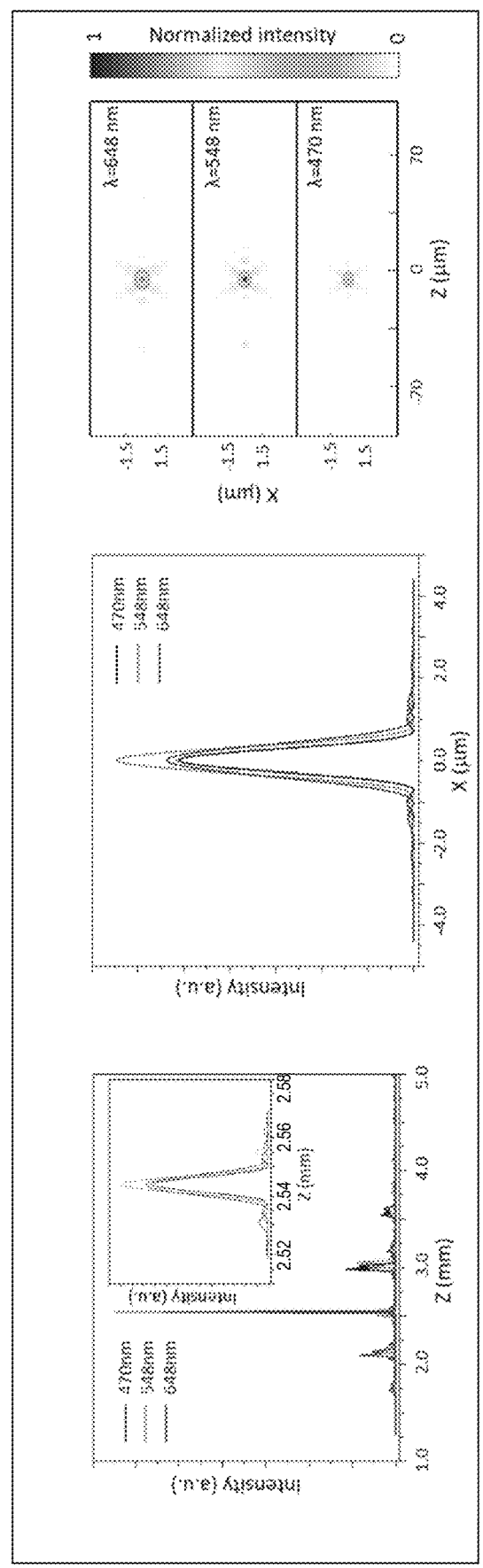
FIGS. 8A-8F illustrate simulations of a metalens with NA=0.3, according to an embodiment.
Figures 8D, 8E, 8F:
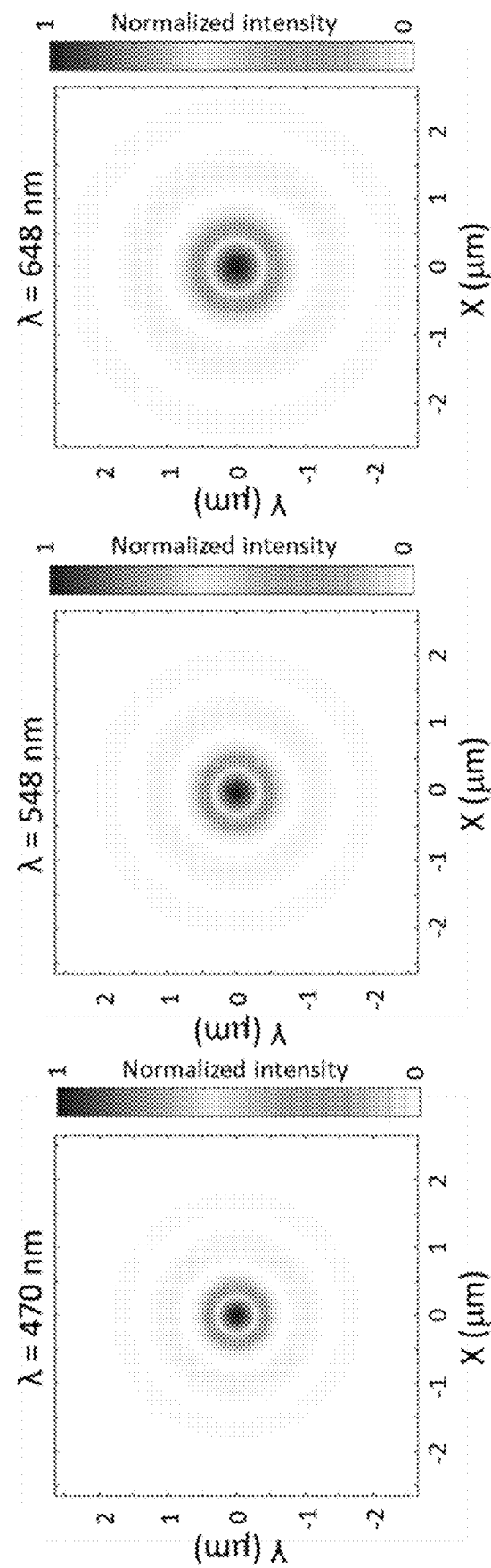
Figures 10A, 10B, 10C:
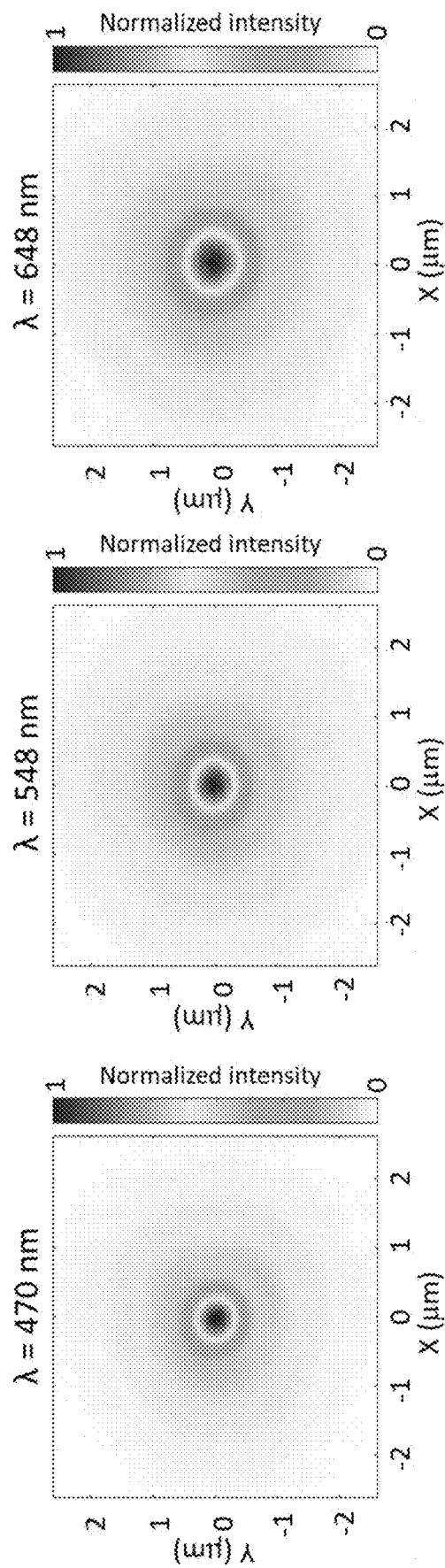
FIGS. 10A-10F illustrate measured focusing intensity distributions of a metalens with NA=0.3 at focal planes, according to an embodiment.

An RGB-achromatic metalens with NA=0.3 and diameter D=2 mm was designed by employing the dispersion engineering and the zone interference engineering method. Different from the design of the metalens with NA=0.7, the phase discontinuities at zone boundaries, zone transition locations, and RGB wavelengths are optimized so that constructive interference of the light at design wavelengths only happens at the designed focal length. FIGS. 10A-10F illustrate simulations of the metalens with NA=0.3. FIG. 10A shows simulated focusing intensity distribution of the metalens with NA=0.3 along its optical axis at three design wavelengths: 470 nm, 548 nm, and 648 nm. It shows pronounced overlapping main focus peaks and negligible side peaks. FIG. 8A shows the simulated focusing intensity distributions at the design wavelength of 480 nm, 548 nm, and 648 nm along the optical axis, and the inset is the zoomed-view of the focus peaks. As can be seen that, the light at the design wavelengths focuses at the same focal length, and spurious peaks elsewhere along the optical axis are also greatly suppressed. The inset is the zoomed-in view of the main focus peaks showing the same focal length at design wavelengths. FIG. 8B shows simulated focusing intensity distribution along the radial direction and at the focal planes. The calculated Strehl ratios are all close to unity. FIG. 8B shows the focusing intensity distributions at the three design wavelengths along the radial direction, and the simulated Strehl ratios are all close to unity. FIG. 8C shows three panels depicting the simulated focusing intensity distribution at three design wavelengths in the XZ plane where Z is along the optical axis and X is along the radial axis. Three panels in FIG. 8C illustrate focusing distributions at the design wavelengths in the XZ plane where X is along the radial axis and Z is along the optical axis. FIG. 8D-8F illustrate simulated focusing intensity distributions at their focal planes. FIGS. 8D-8F show simulated focusing intensity distribution in the focal planes (XY cross sections) and at wavelength λ=488 nm, 532 nm, and 658 nm, respectively.

Figure 9:
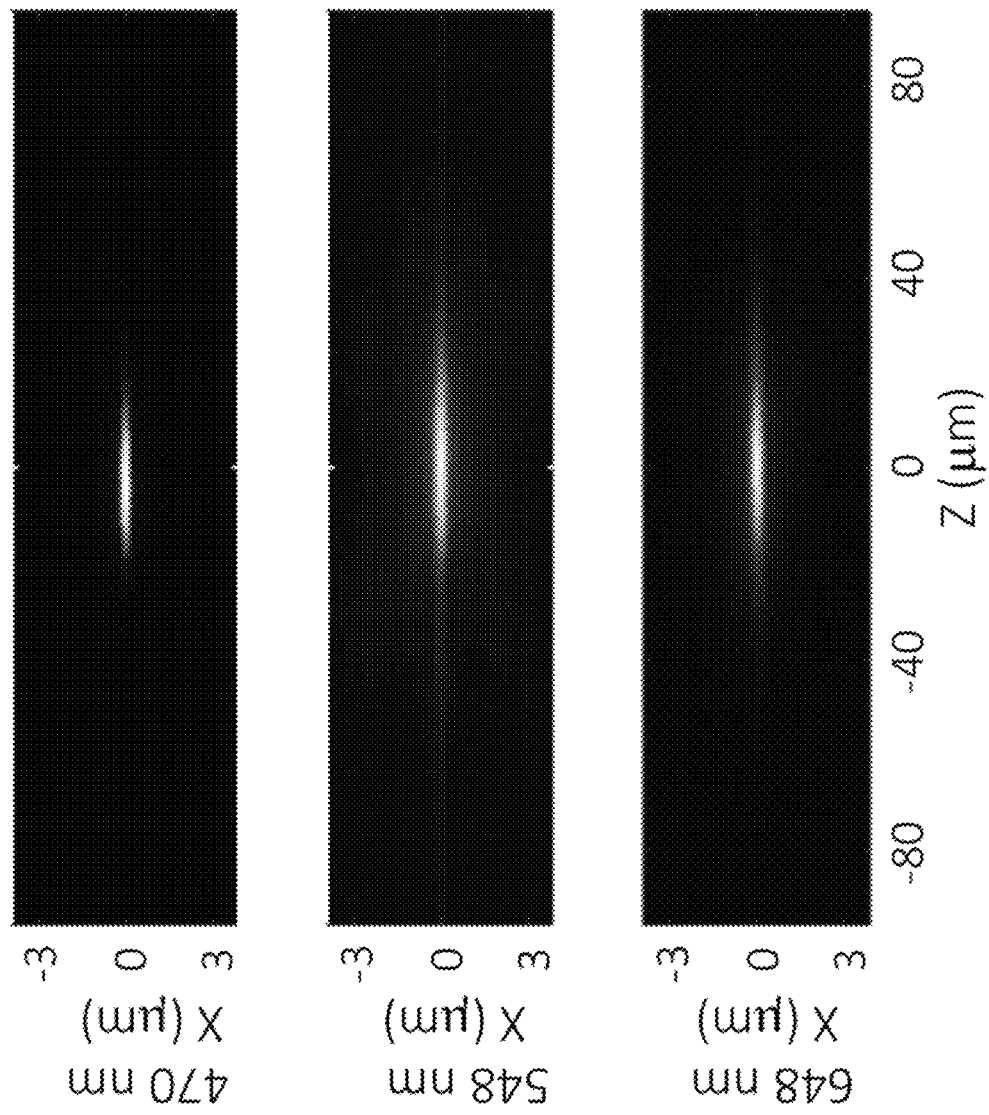
FIG. 9 illustrates three panels showing measured focusing intensity distributions of a metalens with NA=0.3 in the XZ planes where Z is along the optical axis and X is along the radial direction, according to an embodiment.

The measurement of this metalens is summarized FIG. 9. FIG. 9 shows the measured focusing intensity distributions at the design wavelengths of 470 nm, 548 nm, and 648 nm (from top to bottom) in the XZ plane. The focal shifts among the three design wavelengths are negligible. FIG. 9 illustrates three panels showing the measured focusing intensity distributions of the metalens with NA=0.3 in the XZ planes where Z is along the optical axis and X is along the radial direction. The corresponding wavelengths are 470 nm, 548 nm, and 648 nm (from top to bottom).

Figure 10F:
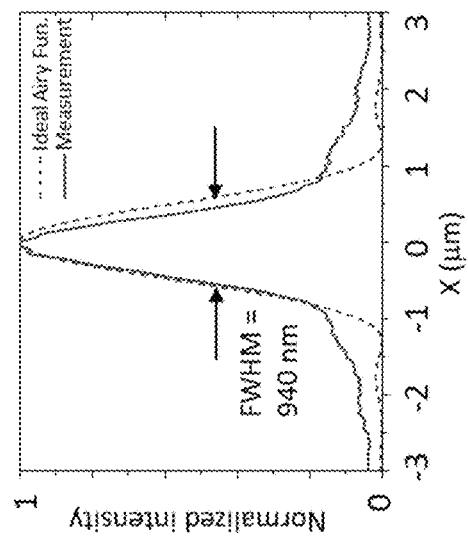
Figure 10E:
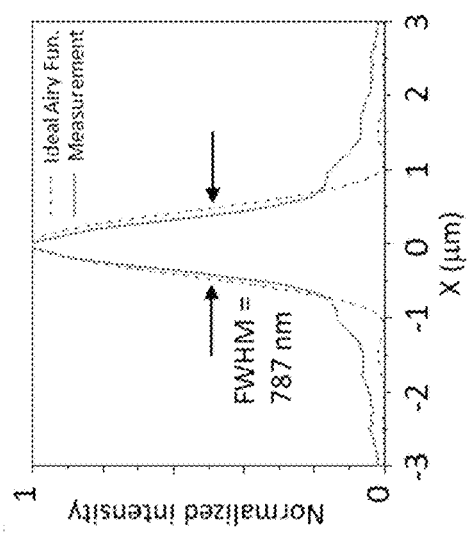
Figure 10D:
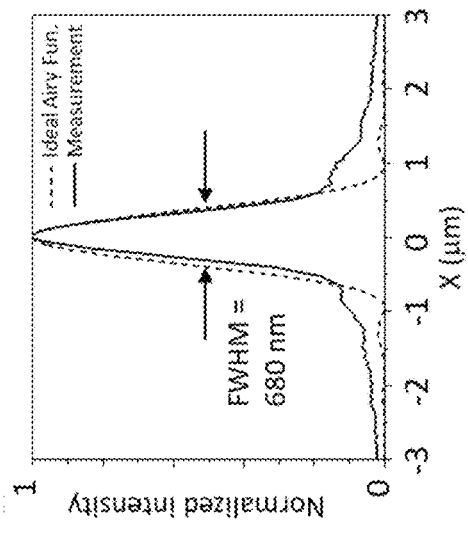

FIGS. 10A-10F illustrate the measured focusing intensity distributions of the metalens with NA=0.3 at focal planes. FIGS. 10A-10C illustrate measured focusing intensity profiles at the focal planes (XY cross sections) of the metalens with NA=0.3 at three design wavelengths: 470 nm, 548 nm, and 648 nm. FIGS. 10A-10C illustrate measured focusing intensity distributions at the design wavelengths and at their common focal planes. FIGS. 10D-10F illustrate solid lines representing the measured focusing intensity distributions along radial direction (of FIGS. 10A-10C) at the design wavelengths of 470 nm, 548 nm, and 648 nm, respectively. In comparison, dashed lines are their corresponding ideal Airy function intensity line profiles. The measurements and the theoretical Airy functions agree well at the center of the focal spots. The tails of the measured focusing peaks show up because the bandwidths of the incident light sources are larger than 5 nm. The measured full-width half-maximums at three design wavelengths are 680 nm, 787 nm, and 940 nm, which are close to the theoretical predictions. The solid lines in FIGS. 10D-10F are their corresponding focusing intensity distributions in the line cut along the radial direction, and the dashed lines are their theoretical Airy function profiles for comparison. The full width half maximum (FWHM) of the focal profiles at wavelengths of 480 nm, 548 nm, and 648 nm is 680 nm, 787 nm, and 940 nm, respectively. They agree with the predictions of the ideal Airy functions. It is noted that discrepancies between the measurements and the theoretical predictions show up at the tails of the focus peaks. It is because the light source used for the metalens characterization is a SuperK supercontinuum laser, and it has a bandwidth that is larger than 5 nm. Such bandwidths can cause the non-negligible tails of the focus peaks.

Figure 11B:
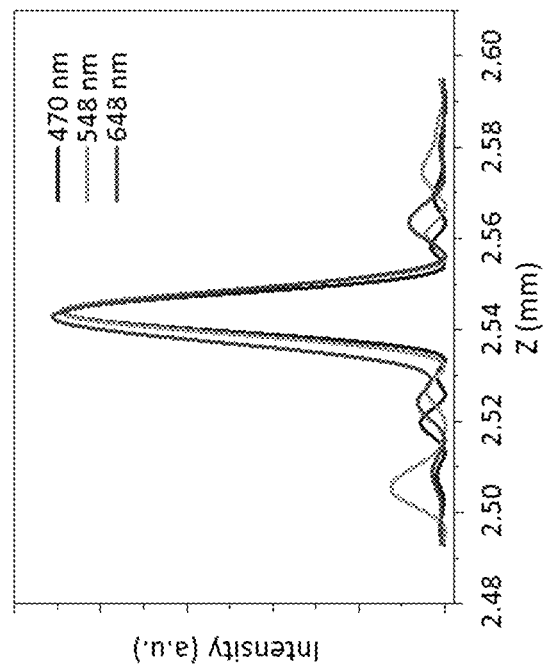
FIGS. 11A-11B illustrate simulations of a metalens with NA=0.3 designed by optimizing phase discontinuities, according to an embodiment.
Figure 11A:
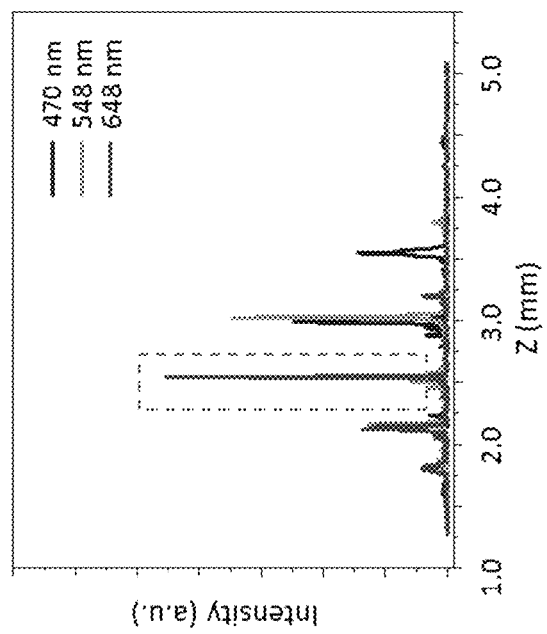

Two control simulations were performed. In the first control simulation, a metalens with the same specifications can be designed by optimizing the phase discontinuities at the zone boundaries without optimizing the zone transition locations. The simulation results of this metalens is summarized in FIGS. 11A-11B. FIGS. 11A-11B illustrate simulations of a metalens with NA=0.3 designed by optimizing phase discontinuities. The light at design wavelengths focuses at the same focal length, however spurious side peaks are pronounced. FIG. 11A illustrates the simulated focusing intensity distributions of a metalens with NA=0.3 at the same design wavelengths of 470 nm, 548 nm, and 648 nm as of the metalens. This metalens can be designed by optimizing phase discontinuities at zone boundaries, but without optimizing the zone transition locations. It shows strong side focus peaks besides the main overlapping focus peaks. FIG. 11B illustrates a zoomed-in view of the focusing intensity distributions around the main focus peaks as shown within the dashed line region in FIG. 11A.

Figure 12C:
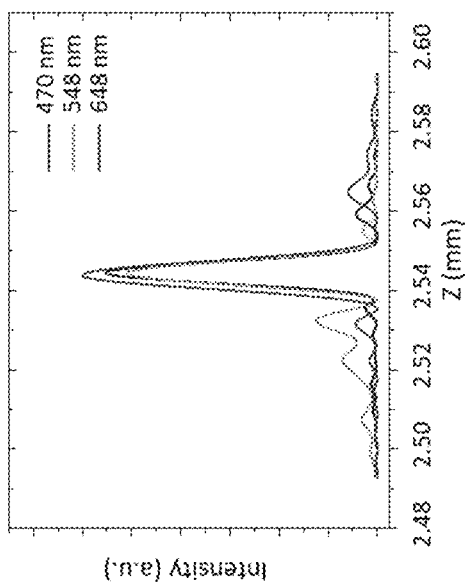
FIGS. 12A-12C show simulations of a metalens with NA=0.3 by using a spatial multiplexing method, according to an embodiment.
Figure 12B:
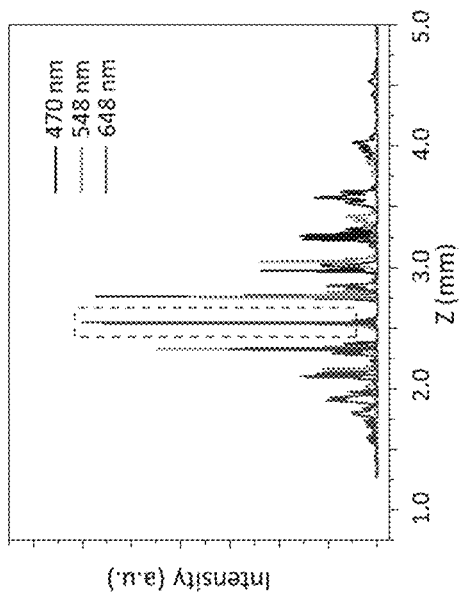
Figure 12A:
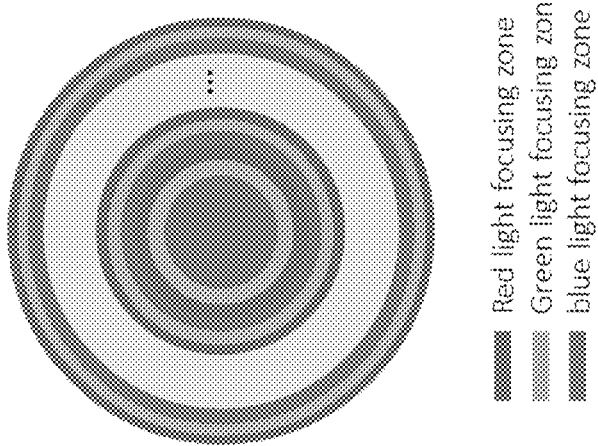

In the second control simulation, a metalens was designed by using the conventional spatial multiplexing method. FIGS. 12A-12C show simulations of a metalens with NA=0.3 by using a spatial multiplexing method. The metalens was divided into 30 different zones (rings) along the radial direction, and each zone is designed for the focusing of a single RGB wavelength as shown in FIG. 12A. FIG. 12A illustrates a schematic drawing of a metalens designed by using the conventional multiplexing method for achromatic focusing of the same three wavelengths as the one with NA=0.3. The whole metalens can be divided into multiple rings, and each ring is designed to focus one of the RGB wavelengths. Each ring may be colored in blue, green, or red according to its design wavelength. The simulation results are shown in FIGS. 12B-12C. FIG. 12B illustrates simulation results of the focusing intensity distributions along the metalens optical axis at three design wavelengths of 470 nm, 548 nm, and 648 nm. FIG. 12C illustrates the zoomed-in view of main focus peaks as shown within the dashed box in FIG. 12B. Similarly, the light at design wavelengths achromatically focuses, however spurious side peaks are pronounced.

Figure 13:
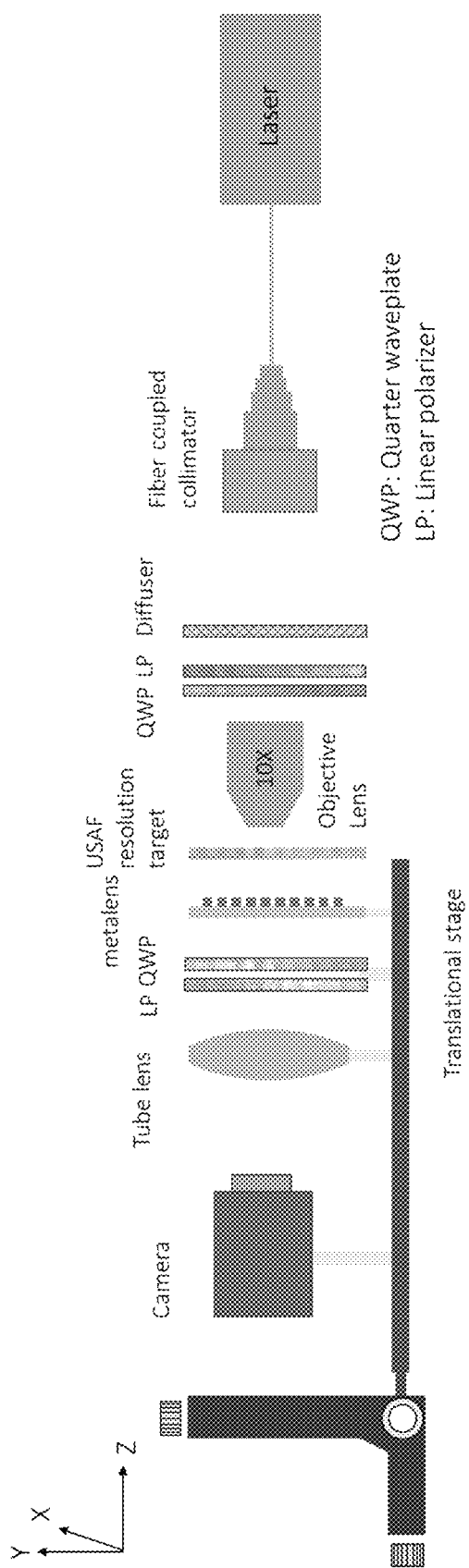
FIG. 13 illustrates a schematic of an optical setup for a metalens imaging test, according to an embodiment.

FIG. 13 illustrates a schematic of the optical setup for a metalens imaging test. One example of the laser source used as shown in FIG. 13 is a SuperK supercontinuum fiber-coupled laser (NKT, EXTREME and VARIA). Diode lasers with very narrow linewidths can be used as the laser sources (not shown). The incident laser beam can be collimated by a fiber coupled collimator. The collimated laser beam can pass through a diffuser, a wire grid polarizer (Thorlabs, WP25M-VIS) and an achromatic quarter waveplate (Thorlabs, AQWP05M-600). It can then be slightly focused by a Mitutoyo objective (10× magnification, NA=0.28) onto an imaging target. In the experiment, a particular resolution target was used. The metalens is placed at distance of a focal length away from the surface of the target. The resolution target image can be captured by a sCMOS camera (PCO, panda 4.2) through a microscope system comprising the metalens and a tube lens (Thorlabs, TTL180-A) with focal length f=180 mm. Another pair of wire grid polarizer (Thorlabs, WP25M-VIS) and quarter waveplate (Thorlabs, AQWP05M-600) can be placed between the metalens and the tube lens to select the output beam in the cross-polarized state in order to reduce imaging background.

Figure 14A:
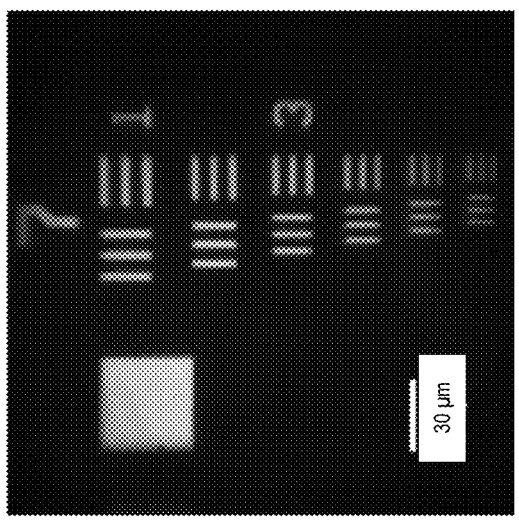
FIGS. 14A-14C illustrate imaging results of a resolution target by a metalens with NA=0.3, according to an embodiment.
Figure 14B:
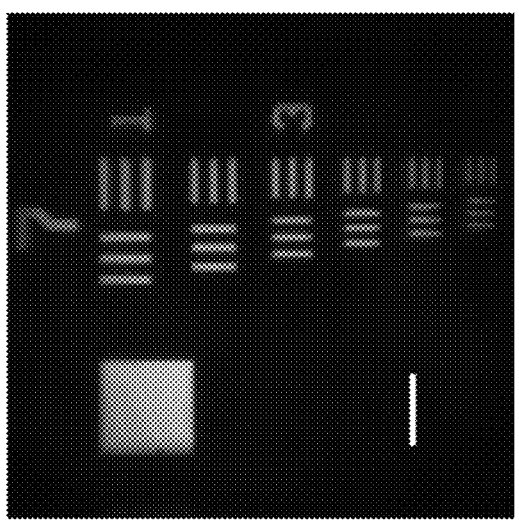
Figure 14C:
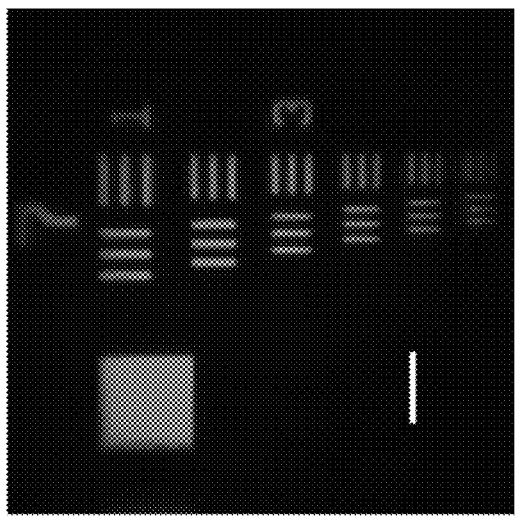

FIGS. 14A-14C illustrate resolution target images by the metalens with NA=0.3 in synthesized colors by mixing two of the RGB incident lights. FIGS. 14A-14C illustrate imaging results of the resolution target by the metalens with NA=0.3. The selected imaging region is the group No. 7. FIG. 14A illustrates the imaging result under a mixture of green and red illumination. FIG. 14B illustrates is the imaging result under a mixture of the blue and green illumination. FIG. 14C illustrates is the imaging result under a mixture of blue and red illumination. The scale bar is 30 μm.

Figure 15:
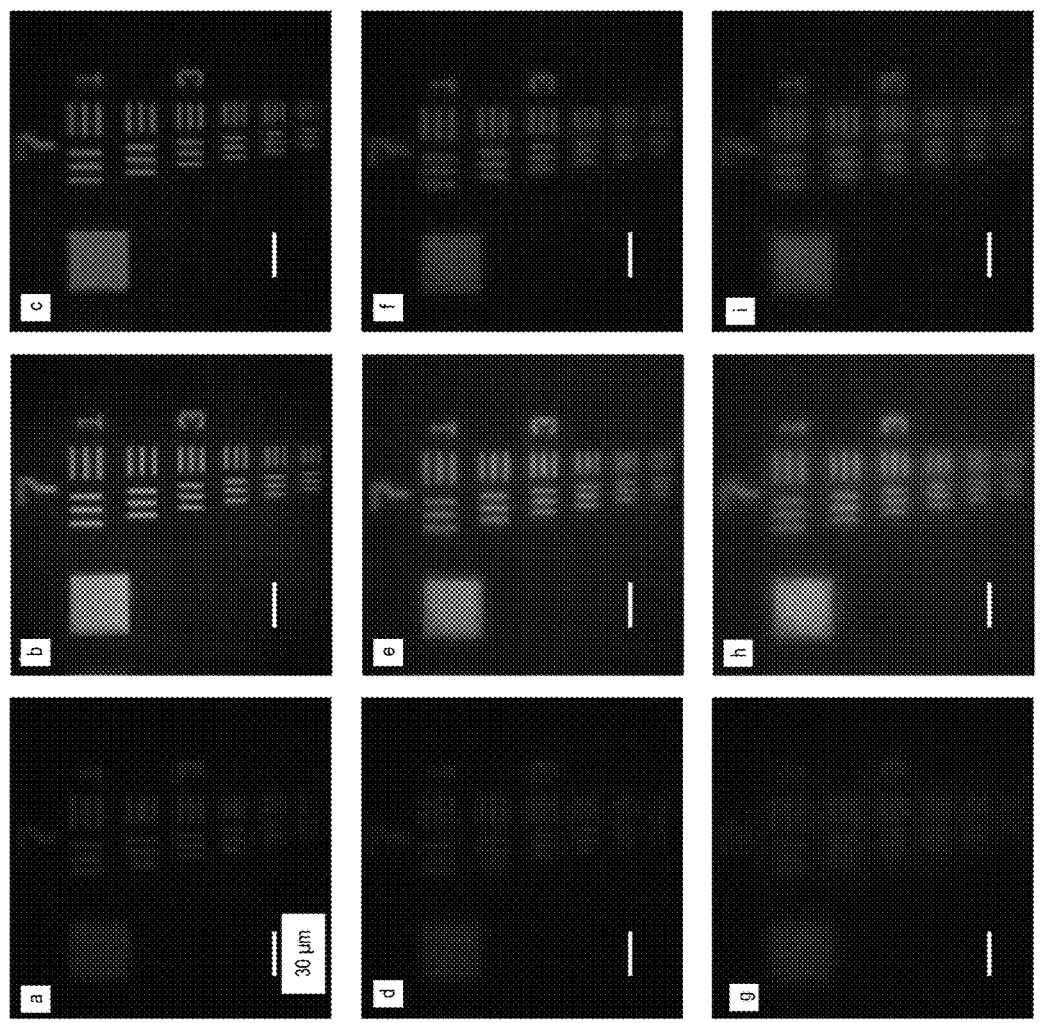
FIG. 15 illustrates resolution target images by a metalens with NA=0.3 relative to RGB incident light bandwidth, according to an embodiment.

FIG. 15 (parts A-I) illustrate resolution target images by the metalens with NA=0.3 as increased RGB incident light bandwidth. FIG. 15, parts A-C, illustrate imaging results of the resolution target by the metalens of NA=0.3 at three design wavelengths: 470 nm, 548 nm, and 648 nm. The selected imaging region is group No. 7 and the incident light source can be a SuperK supercontinuum fiber-coupled laser with bandwidth of 5 nm. FIG. 15, parts D-F, illustrate imaging results of the same target area with incident light source linewidth of 15 nm. FIG. 15, parts G-I, illustrate imaging results of the same target area with incident light source linewidth of 30 nm.

Figure 16:
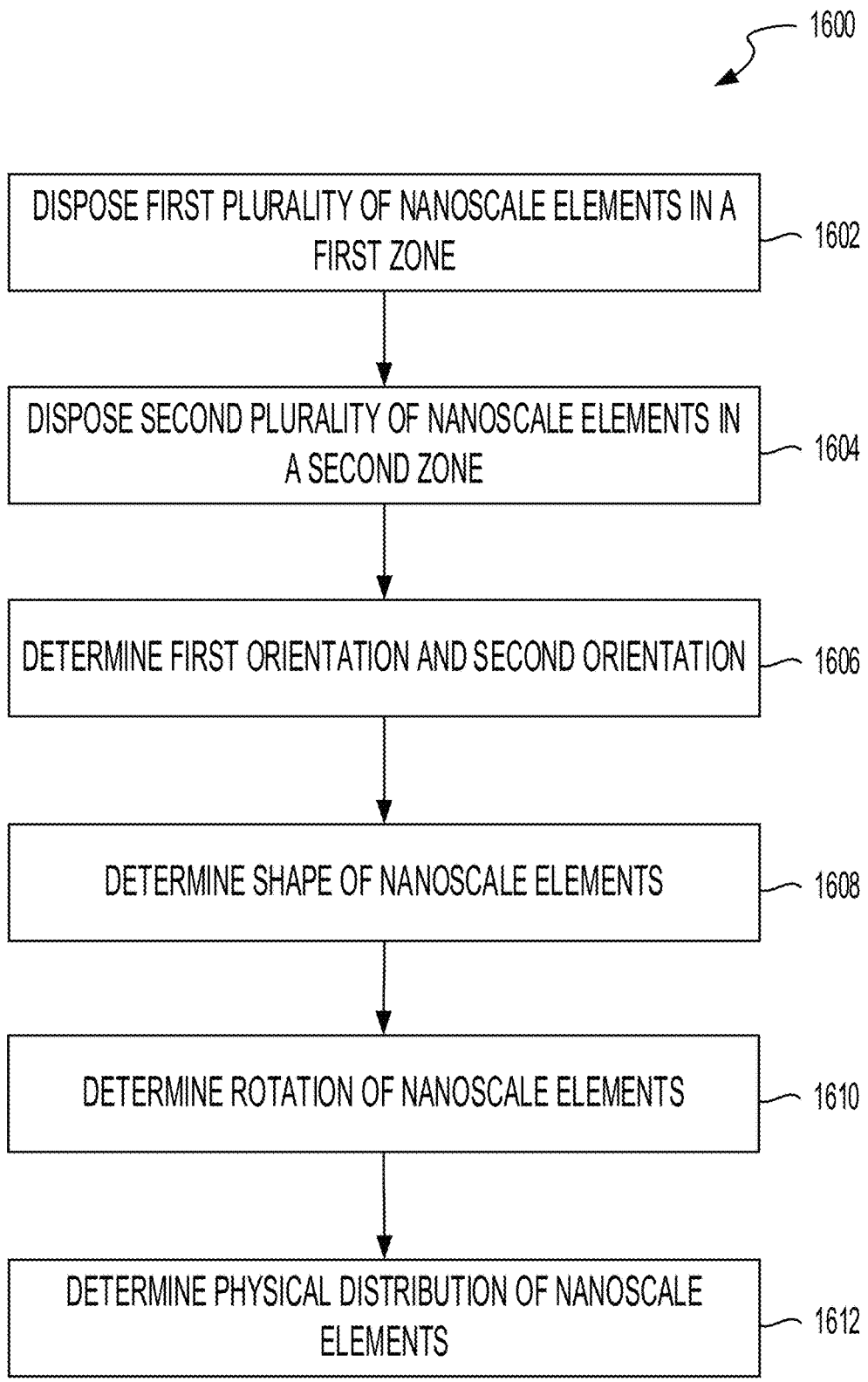
FIG. 16 illustrates a flow chart of a method for manufacturing an optical device, according to an embodiment.

FIG. 16 illustrates a flow chart of a method 1600 for manufacturing an optical device according to an embodiment. The method 1600 may include disposing (e.g., forming, establishing, placing, arranging, configuring, distributing) a first plurality of nanoscale elements in a first zone 1602. The first plurality of nanoscale elements may include or have a first optical dispersion profile and/or a first orientation. An optical dispersion profile can include a representation (e.g., graphic, plot, relationship) of dispersion (e.g., group delay, group delay dispersion, etc.). A first orientation can include an angular position or direction of an object (e.g., a first plurality of nanoscale elements) relative to a reference (e.g. reference point, a second plurality of nanoscale elements). The method may include disposing a second plurality of nanoscale elements in a second zone 1604. The second plurality of nanoscale elements may include or have a second optical dispersion profile and/or a second orientation. A second orientation can include an angular position or direction of an object (e.g., a second plurality of nanoscale elements) relative to a reference (e.g. reference point, a first plurality of nanoscale elements). The method may include determining (e.g., identifying, selecting, optimizing, etc.) the first orientation and/or the second orientation based on constructive interference (e.g., to maximize constructive interference) for a plurality of wavelengths and/or a focal length 1606.

In some embodiments, the method may include determining (e.g., identifying, selecting, calculating) a shape (e.g., structural or physical configuration) of each of the plurality of nanoscale elements 1608. Determining a shape of each of the plurality of nanoscale elements can include determining or identifying a combined effect of each of the plurality of nanoscale elements on the optical dispersion profile of a zone. Determining a shape of each of the plurality of nanoscale elements can affect (e.g., change, alter, influence) the optical dispersion profile of the zone. Determining a shape of each of the plurality of nanoscale elements can affect (e.g., change, alter, influence) the phase profile of the zone. Determining a shape of each of the plurality of nanoscale elements can result in a plurality of wavelengths (e.g. 480 nm to 680 nm) being focused at the same focal length. The method may include determining a shape of each of the first plurality of nanoscale elements. The method may include determining a shape of each of the second plurality of nanoscale elements.

In some embodiments, the method may include determining (e.g., identifying, selecting, calculating) a rotation (e.g., direction, orientation) of each of the plurality of nanoscale elements 1610. Determining a rotation of each of the plurality of nanoscale elements can include determining or identifying a combined effect of each of the plurality of nanoscale elements on the optical dispersion profile of a zone. Determining a rotation of each of the plurality of nanoscale elements can affect (e.g., change, alter, influence) the phase profile of the zone. Determining a rotation of each of the plurality of nanoscale elements can result in a plurality of wavelengths (e.g. 480 nm to 680 nm) being focused at the same focal length. The method may include determining a rotation of each of the first plurality of nanoscale elements. The method may include determining a rotation of each of the second plurality of nanoscale elements.

In some embodiments, the method may include determining (e.g., calculating, selecting, optimizing) a physical distribution of the plurality of nanoscale elements 1612 (e.g., within a corresponding zone). Determining a physical distribution of the plurality of nanoscale elements can include determining or identifying positions of each of the plurality of nanoscale elements relative to each other. Determining a physical distribution of the plurality of nanoscale elements can include spacing each of the plurality of nanoscale elements a distance from each other. Determining a physical distribution of the plurality of nanoscale elements can affect (e.g., change, alter, influence) the optical dispersion profile of a zone. The method may include determining a physical distribution of the first plurality of nanoscale elements. The method may include determining a physical distribution of the second plurality of nanoscale elements.

Figures 17A, 17B, 17C:
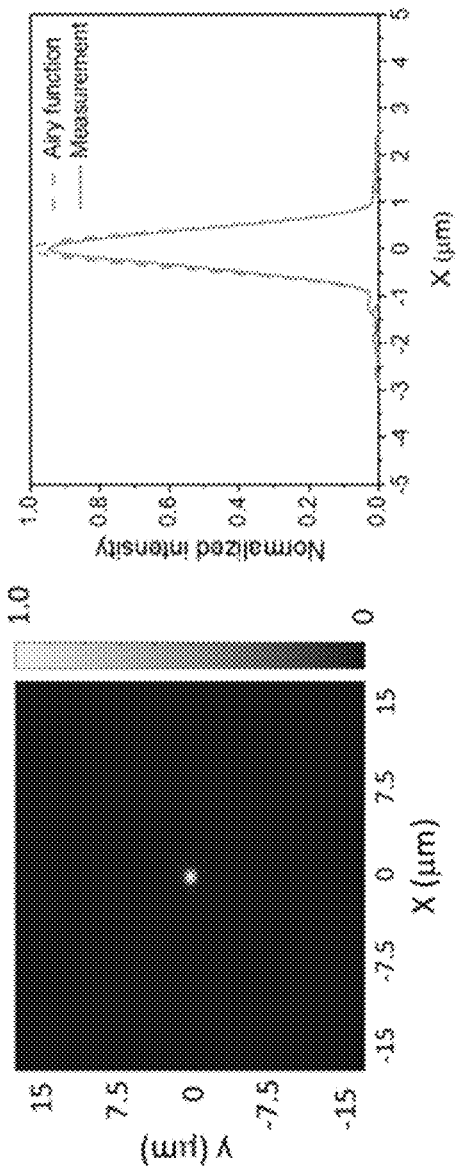
FIGS. 17A-17C illustrate measured modulation transfer function of a metalens with NA=0.3 at 532 nm wavelength, according to an embodiment.

FIGS. 17A-17C illustrate measured modulation transfer function (MTF) of a metalens with NA=0.3 at 532 nm wavelength. The MTF of the metalens with NA=0.3 can be characterized. A laser diode can be used as a light source with incident wavelength of 532 nm and linewidth of 1 nm. FIG. 17A illustrates the measured focusing intensity profile in the focal plane. The solid line in FIG. 17B illustrates the measured focusing intensity line profile through the focal spot center. The dashed green line in FIG. 17B illustrates the ideal Airy function profile for comparison. The measurement is can be close to the Airy function profile, and the calculated Strehl ratio can be 0.95 which can indicate diffraction-limited focusing. FIG. 17C illustrates MTF measurement results. The solid line and dashed line correspond to measured tangential and sagittal MTF, respectively. The theoretical MTF profile assuming the metalens is aberration-free and has NA of 0.3 is shown. The MTF measurements in both directions can be close to theoretical prediction.

Figure 18C:
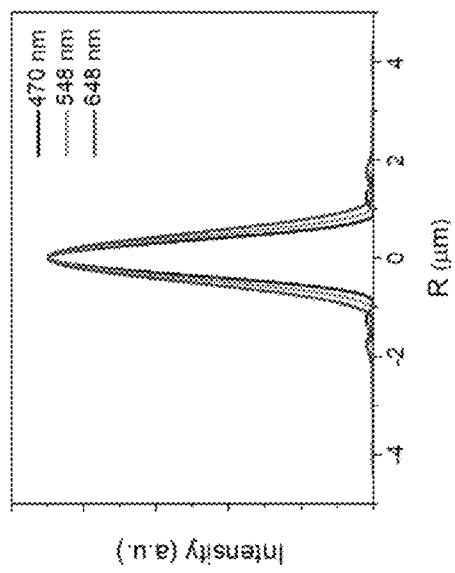
FIGS. 18A-18F illustrate simulations of a 1 cm-diameter RGB-achromatic metalens, according to an embodiment.
Figure 18B:
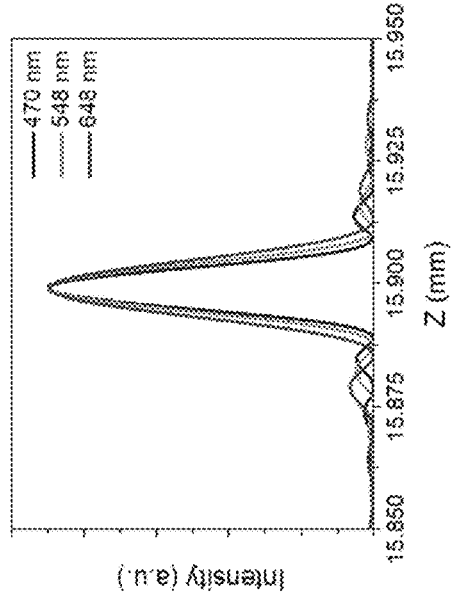
Figure 18A:
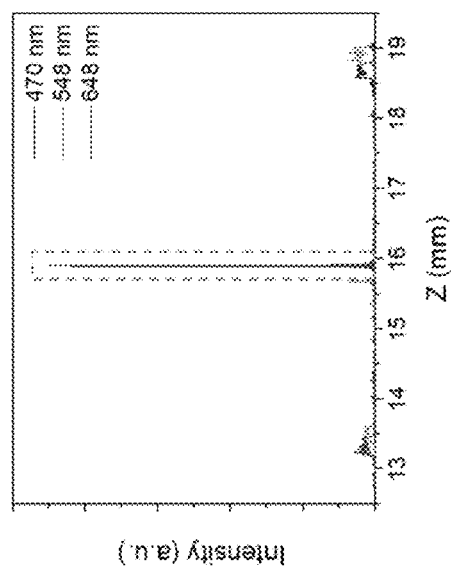
Figures 18D, 18E, 18F:
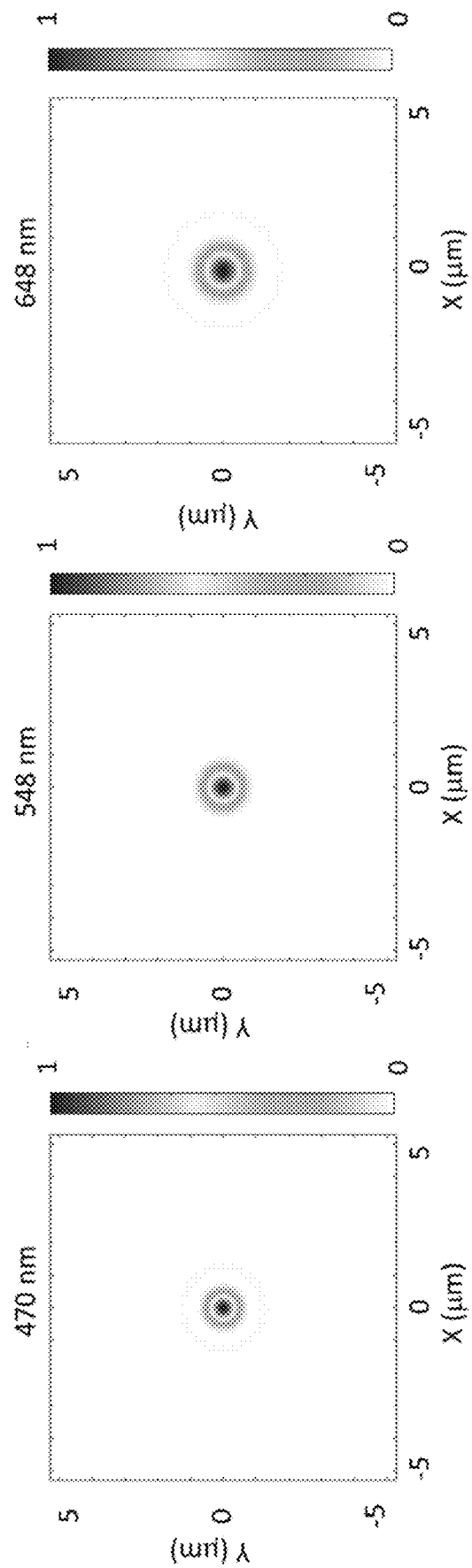

FIGS. 18A-18F illustrate simulations of a 1 cm-diameter RGB-achromatic metalens. The metalens can be designed for achromatic focusing of the three wavelengths of 470 nm, 548 nm, and 648 nm. The NA of the 1 cm-diameter metalens can be 0.3. This metalens can include 856 zones. FIG. 18A illustrates the focusing intensity distribution at three wavelengths along optical axis. Pronounced focusing peaks can show up at design focal length while intensity distributed elsewhere is negligible. FIG. 18B illustrates a zoomed-in view of the focusing peaks as marked in the dashed box shown in FIG. 18A. FIG. 18C illustrates focusing intensity line profiles through centers of focal points and along radial directions. The corresponding Strehl ratio at three wavelengths can be close to unity indicating diffraction-limited focusing. FIGS. 18D-18F illustrate calculated focusing intensity distribution in the focal planes at wavelengths of 470 nm, 548 nm, and 648 nm, respectively.

FIGS. 19A-19D illustrate simulations of an RGB-achromatic metalens doublet. One challenge of high-NA metalens can include its higher order aberrations, which can limit FOV and can degrade imaging quality. The metalenses of the present disclosure can correct monochromatic aberrations (e.g., spherical aberration and astigmatism) and chromatic aberration under normal incidence. To achieve large FOV, the metalens can correct higher order aberrations. An RGB-achromatic metalens doublet can correct monochromatic aberrations (e.g., spherical aberration and astigmatism) and chromatic aberration under normal incidence, and can address higher order aberrations (e.g., coma and field curvature) and chromatic aberration under oblique incidence.

Figures 19A, 19B, 19C, 19D:
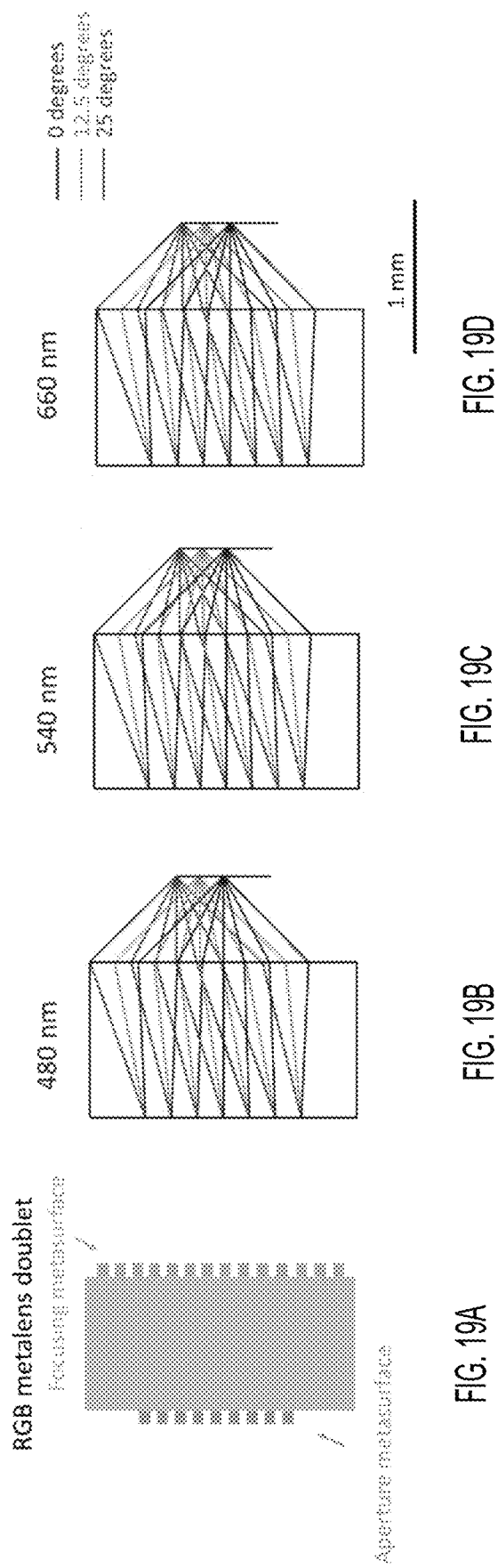
FIGS. 19A-19D illustrate simulations of an RGB-achromatic metalens doublet, according to an embodiment.

FIG. 19A illustrates a metalens doublet. The metalens doublet include two metasurfaces that are patterned on both sides of a fused silica substrate. The metasurface facing the incident light can include an aperture metasurface, and the other metasurface can include a focusing metasurface. These two metasurfaces (e.g., aperture metasurface and focusing metasurface) together can form a telecentric configuration. The diameter of the aperture metasurface and the focusing metasurface can be 1 mm and 1.8 mm, respectively. The thickness of the substrate can be 1 mm. The RGB metalens doublet can achieve a field of view of 50 degrees and NA of ~0.7. FIG. 19B shows the ray tracing diagrams of the metalens doublet at an incident wavelengths of 480 nm. FIG. 19C shows the ray tracing diagrams of the metalens doublet at an incident wavelengths of 540 nm. FIG. 19D shows the ray tracing diagrams of the metalens doublet at an incident wavelengths of 660 nm. For each wavelength, optical ray tracings under three different incident angles of 0, 12.5, and 25 degrees are shown. The focal length, which can be defined as the distance between the focusing metasurface and the image plane, can be the same. Under normal incidence, three wavelengths can be focused to the same center point at the image plane indicating achromatic focusing. At each wavelength, oblique incident rays at three angles can converge to three focal points at the same focal plane (e.g., image plane). This can indicate the metalens doublet corrects coma and field curvature. In comparison, a refractive lens can focus incident light of different angles to different focal lengths due to the curvature of lens surface and thus can cause aberration of field curvature. At a certain incident angle, the positions of focal points at different wavelengths can be the same. The metalens doublet can correct chromatic aberration under different oblique incidence (e.g., transverse aberration).

Figures 20A, 20B, 20C, 20D, 20E:
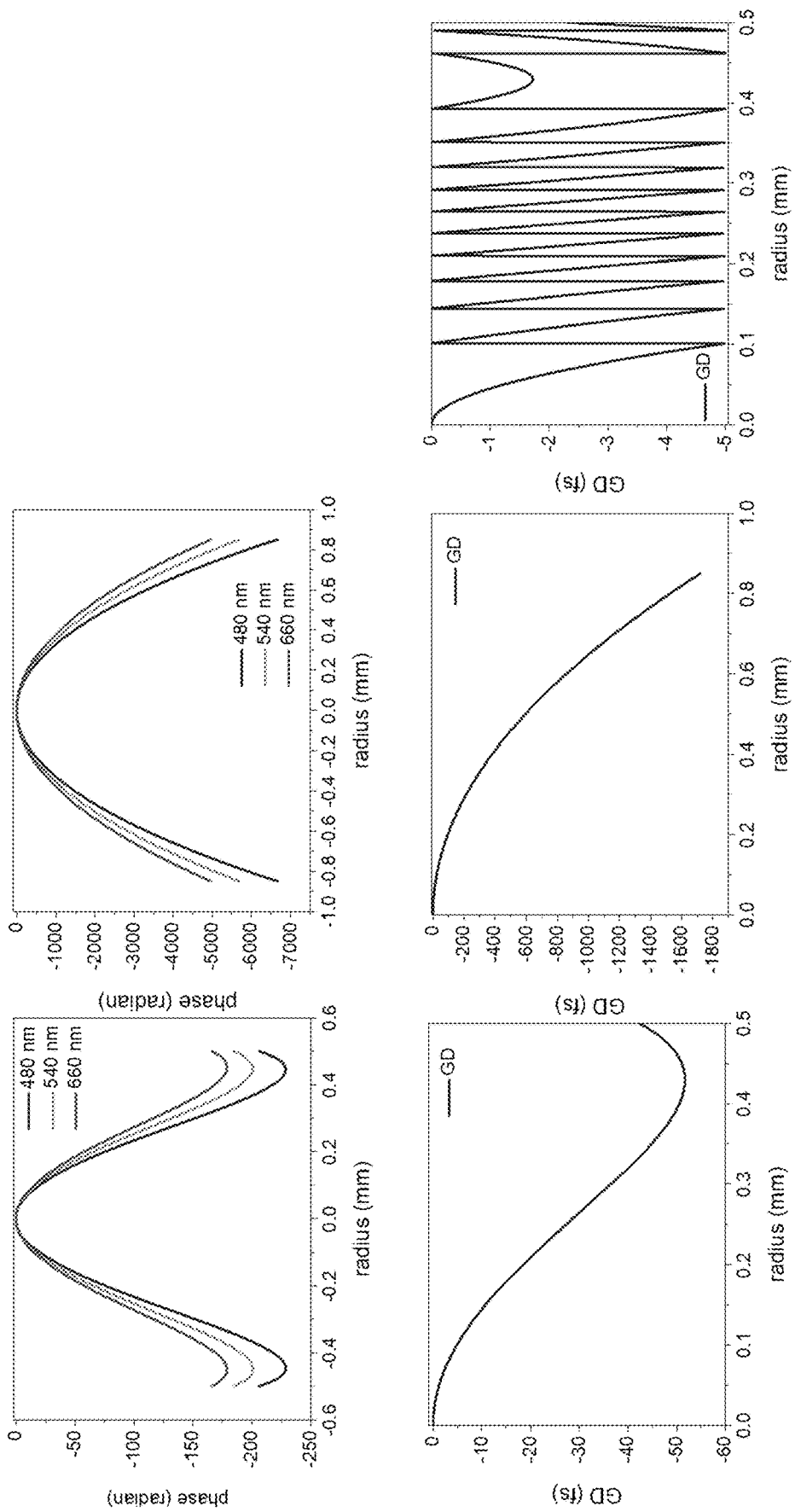
FIGS. 20A-20E illustrate phase profiles of metasurfaces, according to an embodiment.

FIGS. 20A-20E illustrate phase profiles of metasurfaces, according to an embodiment. To achieve target focusing performance, the phase profiles of the aperture metasurface and the focusing metasurface at different wavelengths can be engineered independently. FIG. 20A shows the target phase profiles of the aperture metasurface at three wavelengths, and FIG. 20B shows the target phase profiles of the focusing aperture metasurface. FIG. 20C illustrates the target group delay profile of the aperture metasurface. FIG. 20D illustrates the target group delay profile of the focusing metasurface. Considering the maximum group delay constrained by a single layer metasurface, the same dispersion engineering and zone interference engineering method can be employed. The metasurfaces can be divided into multiple zones. FIG. 20E shows an example of an aperture metasurface that consists of 13 zones. The maximum group delay range within each zone can be bounded by 5fs, which can be satisfied. The phase discontinuities at zone boundaries can be engineered according to constructive zone interference.

FIGS. 21A-21E illustrate simulations of a metasurface-based achromatic quarter waveplate (QWP). Conventional quarter waveplates can be bulky. The thickness can be about 1 mm. Commercial QWPs can be based on birefringent crystals, which have a different refractive index between two orthogonal axes (e.g., TE and TM). The performance of such an achromatic QWP can be limited. The retardance between two orthogonal axes can change the wavelength, and can be due to the material dispersion. The metasurface-based compact achromatic QWP can offer superior performance compared to conventional quarter waveplates.

A schematic of a unit cell of an achromatic QWP metasurface is shown in FIG. 21A. The achromatic QWP metasurface can include two layers of metasurfaces on top of transparent fused silica substrate. The top layer can include a $TiO_2$ nanofin, and the bottom layer can include a $SiO_2$ nanofin that is embedded in $TiO_2$ matrix. The total thickness of double layered metasurface can be less than 1 mm. FIGS. 21B-21E shows simulation results of an optimized metasurface out of a library containing ~120K elements. The solid line in FIG. 21B shows simulated retardance between TE and TM incident light over the visible band in unit of $\pi$. For reference, the dashed line is the target achromatic QWP performance with constant retardance of constant $0.5\pi$ (e.g., 0.25 waves). The simulation results can be close to target profile showing achromatic performance. The maximum discrepancy can be defined as $$\max\left|\Delta\phi(\lambda) - \frac{\pi}{2}\right|$$

and can be $0.19\pi$, and the average discrepancy can be defined as $$avg\left|\Delta\phi(\lambda) - \frac{\pi}{2}\right|$$

and can be $0.02\pi$. FIG. 21C shows the transmission spectra of TE and TM incident light. The maximum transmission difference between TE and TM incident light can be defined as $\max|\Delta T(\lambda)|$ and can be 0.09, and the average transmission difference can be defined as $avg|\Delta T(\lambda)|$ and can be 0.04. FIG. 21D shows the conversion efficiency from a linear polarized light to an LCP (RCP) polarized light. The conversion efficiency can be 0.998, and average conversion efficiency can be 0.93. FIG. 21E shows the purity of converted LCP (RCP) output, and the average purity can be 0.996 in the visible.

Figure 22:
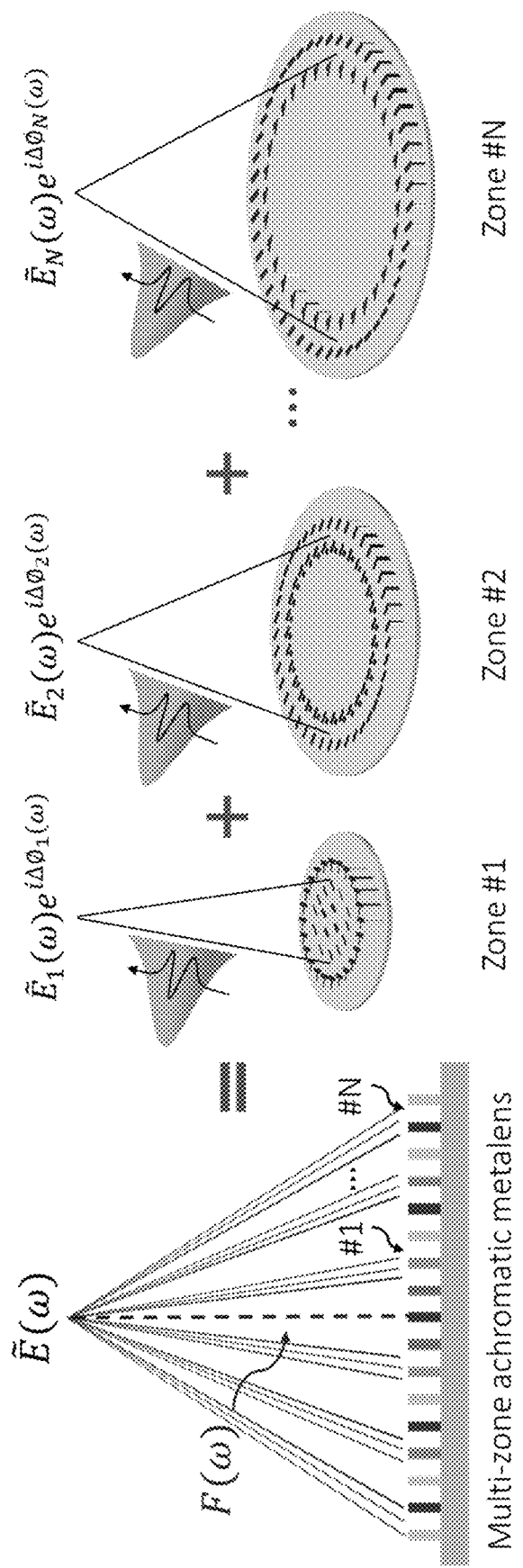
FIG. 22 illustrates a schematic of a multi-zone RGB-achromatic metalens showing achromatic focusing of RGB light coming from different zones, according to an embodiment.

FIG. 22 illustrates a schematic of a multi-zone dispersion-engineered metalens. The multi-zone dispersion-engineered metalens can employ the design principle shown in Equation 3.

$$\tilde{E}(\omega) = \sum_{i=1}^{N}\left(\int_{r_{i-1}}^{r_i} t(\omega, r)e^{i\phi_{i(\omega,r)}}rdr\right)e^{i\Delta\phi_{i(\omega)}} = \sum_{i=1}^{N}\tilde{E}_i(\omega)e^{i\Delta\phi_{i(\omega)}} \quad (3)$$

where N is the number of zones, and $r_i$ is the radial coordinate of each zone boundary ($r_0=0$), $t(\omega, r)$ characterizes the amplitude of the scattered electric field by meta-atoms at frequency of ω, $\emptyset_i(\omega, r)$ is the designed phase profile within the $i^{th}$ zone, $\Delta\emptyset_i(\omega)$ is the phase discontinuity at the boundary between $(i-1)^{th}$ and $i^{th}$ zone ($\Delta\emptyset_1(\omega)=0$). The electric field $\tilde{E}(\omega)$ at the focal spot can be determined by the interference of electric field within each zone ($t(\omega,r)e^{i\emptyset_i(\omega,r)}$) and the interference of the electric fields ($\tilde{E}_i(\omega)$) from N different zones. To maximize the focusing intensity $|\tilde{E}(\omega_0)|^2$ at a single frequency $\omega_0$, the desired phase profile within each zone can be hyperbolic (e.g., $\emptyset_i(\omega_0,r)=\omega_0/c(F(\omega_0)-\sqrt{F(\omega_0)^2+r^2})$, where $F(\omega_0)$ is the focal length at frequency $\omega_0$). In addition the phase discontinuities at the zone boundaries can be zero, $\Delta\emptyset_i(\omega_0)=0$. To achieve controlled focusing at different frequencies, a multi-objective optimization function as $\max(\min(|\tilde{E}(\omega_i)|^2))$ can be set, where $\omega_i \in \{\omega_1, \omega_2 \ldots \omega_n\}$ is the design frequency. This can maximize the minimum value of the focusing intensity at design frequencies. The lens phase profiles within each zone can be engineered according to Equation 4.

$$\emptyset_i(\omega, r) = \tag{4}$$
$$\frac{\omega}{c}\left(F(\omega) - \sqrt{F(\omega)^2 + r^2}\right) + \emptyset_0(\omega) = \frac{\omega_0}{c}\left(F(\omega_0) - \sqrt{F(\omega_0)^2 + r^2}\right) +$$
$$\frac{\partial\emptyset_i(\omega, r)}{\partial\omega}(\omega - \omega_0) + \frac{\partial^2\emptyset_i(\omega, r)}{2\partial\omega^2}(\omega - \omega_0)^2 + \emptyset_0(\omega)$$

where $F(\omega)$ is the focal length at frequency ω, r is the radial coordinate, $\omega_0$ is the center design wavelength, and $\emptyset_0(\omega)$ is the phase at the metalens center. This designed phase profile can be realized by employing spatially varied meta-atoms that can independently control phase and dispersion (e.g., group delay $\partial\emptyset_i/\partial\omega$, group delay dispersion $\partial^2\emptyset_i/\partial\omega^2$). In this way, light from an individual zone can constructively interfere at a focal spot for all design frequencies. Furthermore, zone interference can be engineered using an inverse design method. The zone transition locations $r_i$ and the phase discontinuities $\Delta\emptyset_i(\omega)$ can be optimized using the method of moving asymptotes, which is a gradient-based local optimization method. The engineered meta-atoms can impose an additional $\Delta\emptyset_i(\omega)$ onto each zone's phase profile $\emptyset_i(\omega, r)$ without altering the local phase gradient and, thus, light interference within each zone. $\Delta\emptyset_i(\omega)$ can be independent of lens location r within each zone (e.g., $\partial\Delta\emptyset_i(\omega)/\partial r=0$). The phase discontinuity at a certain frequency ω can be related to the center frequency $\omega_0$ according to Equation 5.

$$\Delta\emptyset(\omega, r_i) = \tag{5}$$
$$\Delta\emptyset(\omega_0, r_i) + \frac{\omega_0}{c}\left(F(\omega_0) - \sqrt{F(\omega_0)^2 + r_i^2}\right) - \frac{\omega}{c}\left(F(\omega) - \sqrt{F(\omega)^2 + r_i^2}\right)$$

Figure 23A:
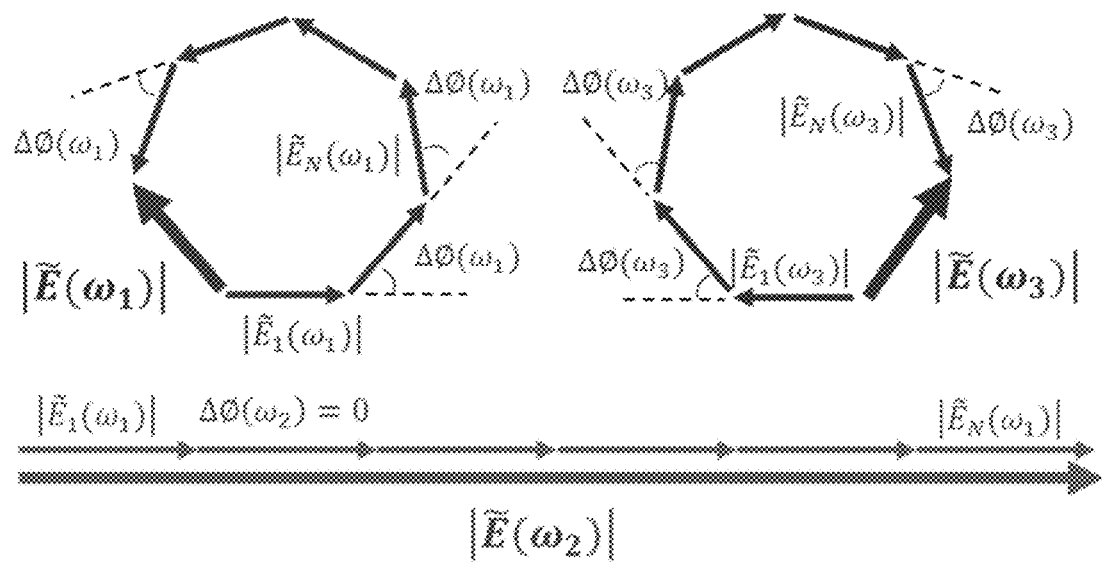
FIG. 23A and FIG. 23B illustrate phasor diagrams of a Fresnel lens and a dispersion-engineered metalens at the design focal spot, according to an embodiment.
Figure 23B:
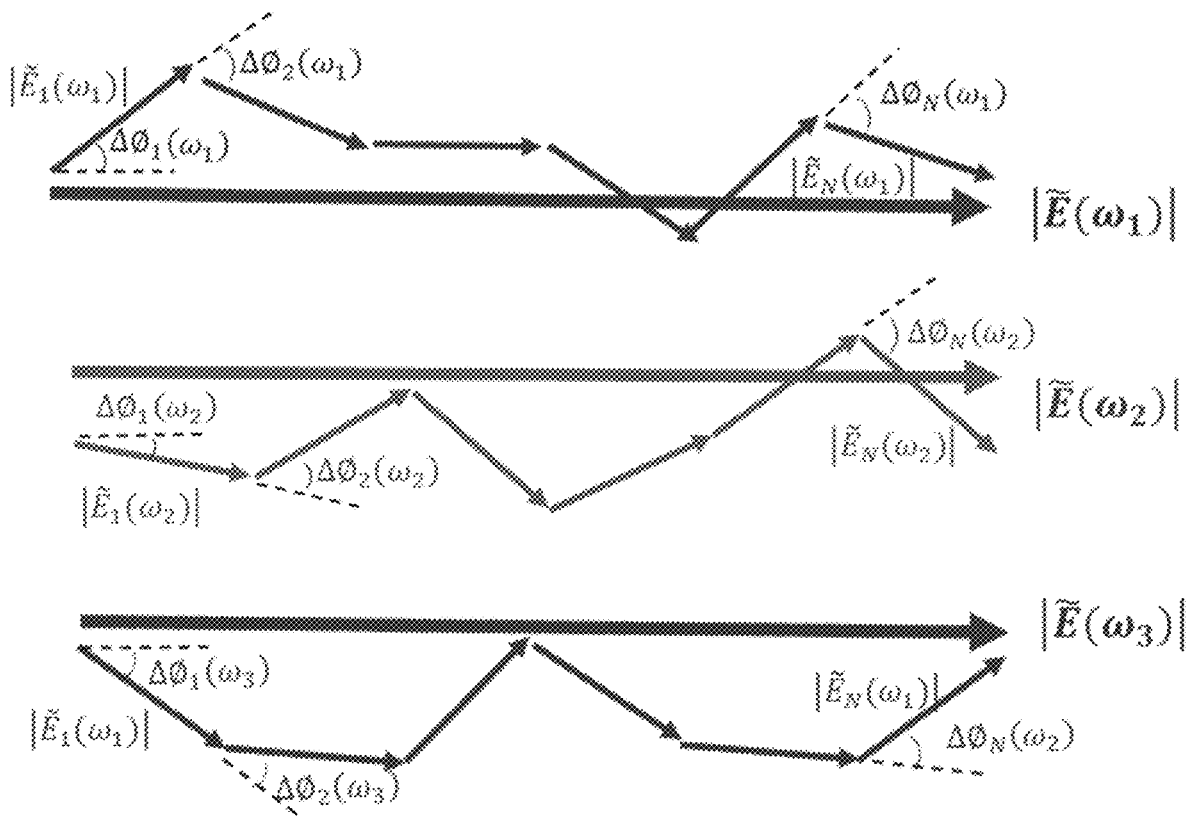

FIG. 23A illustrates phasor diagrams of a Fresnel lens. FIG. 23B illustrates phasor diagrams of a dispersion-engineered metalens at the design focal spot. The ability to independently engineer phase profile, dispersion within each zone, and phase discontinuities at zone boundaries can rewrite the physics governing a Fresnel lens, in which these parameters cannot be independently controlled. FIG. 23A shows phasor diagrams of a typical Fresnel lens. FIG. 23B shows phasor diagrams of a dispersion-engineered metalens at the design focal spot. The result of zone interference can be understood as lining up phasor units ($\tilde{E}_i(\omega)$) contributed by each zone with certain angles that are determined by phase discontinuities at zone boundaries ($\Delta\emptyset_i(\omega)$). In the Fresnel lens, phase discontinuities at design frequency ($\omega_2$) are kept zero for constructive interference. However, destructive interference can occur at other frequencies (e.g., $\omega_1$ and $\omega_3$) caused by their fixed non-zero phase discontinuities as well as intrinsic material dispersion. In comparison, in the metalens, phasor units ($\tilde{E}_i(\omega)$) within each zone and phase discontinuities ($\Delta\emptyset_i(\omega)$) at each zone boundary can be engineered to realize overall constructive interference at the design wavelengths.

It is to be understood that the term "design" or "designed" (e.g., as used in "design wavelength," "design focal length" or other similar phrases disclosed herein) refers to parameters set during a design phase; which parameters after fabrication may have an associated tolerance.

At least one aspect of the present disclosure is directed to an optical device. The optical device may include a first zone including or having a first plurality of nanoscale elements. The first plurality of nanoscale elements may include or have a first optical dispersion profile and/or a first orientation. The optical device may include or have a second zone including a second plurality of nanoscale elements. The second plurality of nanoscale elements may include or have a second optical dispersion profile and/or a second orientation. The first orientation and/or the second orientation may be configured according to constructive interference for a plurality of wavelengths and/or a focal length. The nanoscale elements may define an angle-dependent phase profile that imparts a wavevector that varies depending on angles of incidence.

In some embodiments, the optical device may include a third zone. The third zone may include a third plurality of nanoscale elements. The third plurality of nanoscale elements may include or have a third optical dispersion profile and/or a third orientation. In some embodiments, the third orientation is configured according to constructive interference at the plurality of wavelengths and/or the focal length. In some embodiments, the first orientation, the second orientation, and/or the third orientation are configured according to constructive interference for at least a first wavelength, a second wavelength, a third wavelength, and/or the focal length. For example, the wavelengths can correspond to an RGB color scheme. For example, the first wavelength can correspond to red, the second wavelength can correspond to green, and/or the third wavelength can correspond to blue. In some embodiments, the optical device may include more than three zones. For example, the optical device may include 3 zones, 10 zones, 100 zones, 200 zones, 300 zones, 400 zones, 500 zones, 600 zones, 700 zones, etc. The number of zones may not correspond to the plurality of wavelengths.

In some embodiments, the first orientation and/or the second orientation are configured according to constructive interference for at least a first wavelength and/or a second wavelength. In some embodiments, the first optical dispersion profile depends on a shape of each of the first plurality of nanoscale elements. The second optical dispersion profile depends on a shape of each of the second plurality of nanoscale elements. Within a zone, the shapes of the nanoscale elements can be configured (e.g., selected, determined) such that the plurality of wavelengths are focused at the same focal length. Within a zone, the rotations (e.g., orientations, positions, etc.) of the nanoscale elements can be configured such that there is constructive interference for the plurality of wavelengths.

In some embodiments, a cross-section of at least one nanoscale element is rectangular or other polygonal shape.

In some embodiments, a cross-section of at least one nanoscale element is elliptical or circular. In some embodiments, a cross-section of nanoscale elements can have a 2-fold rotational symmetry, or more generally, an n-fold rotational symmetry where n is an integer that is 2 or greater than 2.

In some embodiments, nanoscale elements have aspect ratios (e.g., height/width) greater than about one, such as at least about 1.5:1, at least about 2:1, at least about 3:1, at least about 4:1, or at least about 5:1, and up to about 10:1 or greater, or up to about 20:1 or greater. In some embodiments, geometric dimensions (e.g., height/width/length or diameter/height) of nanoscale elements are sub-wavelength, such as about 800 nm or less, about 700 nm or less, or about 600 nm or less.

In some embodiments, the first plurality of nanoscale elements may have a first phase profile. A phase profile can include a representation (e.g., graphic, plot, relationship) of a phase of a periodic function of a variable. The second plurality of nanoscale elements may have a second phase profile. The first phase profile may depend (e.g., collectively) on a rotation of each of the first plurality of nanoscale elements. The second phase profile may depend on a rotation of each of the second plurality of nanoscale elements. The first phase profile may depend (e.g., collectively) on a shape of each of the first plurality of nanoscale elements. The second phase profile may depend on a shape of each of the second plurality of nanoscale elements.

In some embodiments, the first optical dispersion profile may depend on a physical distribution of nanoscale elements of the first plurality of nanoscale elements. An optical dispersion profile can include a representation (e.g., graphic, plot, relationship) of dispersion (e.g., group delay, group delay dispersion, etc.). In some embodiments, the second optical dispersion profile may depend on a physical distribution of nanoscale elements of the second plurality of nanoscale elements.

In some embodiments, a shape of the first zone (e.g., shape of a region or boundary of the first zone, or of the first plurality of nanoscale elements) is different from a shape of the second zone. In some embodiments, the first zone and/or the second zone are concentric rings. The concentric ring shape of the zone can result in a reduction in spherical aberrations and astigmatism, which are general problems for conventional lenses, especially for a single lens. Spherical aberrations and astigmatism may blur and reduce the resolution of an image. In some embodiments, the first plurality of nanoscale elements may include at least one of titanium dioxide, silicon nitride, a polymer, an oxide, a nitride, a sulfide, a pure element, or a combination thereof.

In some embodiments, nanoscale elements are composed of a semiconductor, an oxide (e.g., a metal or non-metal oxide), a nitride (e.g., a metal or non-metal nitride), a sulfide (e.g., a metal or non-metal sulfide), a pure element, or a combination of two or more of these.

In some embodiments, nanoscale elements may include a dielectric material. Examples of suitable dielectric materials include metal and non-metal oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), metal and non-metal nitrides (such as nitrides of silicon (e.g., $Si_3N_4$), boron (e.g., BN), or tungsten (e.g., WN)), metal and non-metal sulfides, and pure elements (e.g., silicon for operation at near-infrared and mid-infrared wavelengths).

In some embodiments, the first plurality of nanoscale elements may include nanopillars (e.g., pillar-like, three-dimensional structures or volumes). In some embodiments, nanoscale elements are slanted nanopillars with a nonzero slant angle with respect to a surface normal of a metasurface grating. In some embodiments, the nonzero slanted angle is about 1 degree or greater, about 2 degrees or greater, about 5 degrees or greater, or about 10 degrees or greater.

In some embodiments, the optical device may include a transmissive substrate including glass or polymer. The first plurality of nanoscale elements and/or the second plurality of nanoscale elements may be disposed on the transmissive substrate. In some embodiments, a substrate is transparent in the visible spectrum, such as a polymer substrate, a glass substrate or one including fused silica. Suitable substrates that are transparent in the visible spectrum can have a light transmittance of at least about 40%, at least about 50%, at least about 60%, at least about 70%, at least about 80%, at least about 85%, at least about 90%, or at least about 95%, over the visible spectrum or a design or working wavelength in the visible spectrum.

Another aspect of the present disclosure is directed to a method of manufacturing an optical device. The method may include disposing a first plurality of nanoscale elements in a first zone. The first plurality of nanoscale elements may have a first optical dispersion profile and/or a first orientation. The method may include disposing a second plurality of nanoscale elements in a second zone. The second plurality of nanoscale elements may have a second optical dispersion profile and/or a second orientation. The method may include determining (e.g., calculating, selecting, identifying, optimizing) the first orientation and/or the second orientation based on constructive interference (e.g., to achieve, optimize or maximize constructive interference) for a plurality of wavelengths and/or a focal length. Determining a first orientation based on a plurality of wavelengths can include identifying (e.g., determining, establishing, selecting) the first orientation relative to a reference (e.g., reference point, a second orientation) such that constructive interference for the plurality of wavelengths is maximized for the first orientation. Determining a second orientation based on a plurality of wavelengths can include identifying (e.g., determining, establishing, selecting) the second orientation relative to a reference (e.g., reference point, a first orientation) such that constructive interference for the plurality of wavelengths is maximized for the second orientation. Determining a first orientation based on a focal length can include identifying (e.g., determining, establishing, selecting) the first orientation relative to a reference (e.g., reference point, a second orientation) such that the plurality of wavelengths are focused at the same focal length. Determining a second orientation based on a focal length can include identifying (e.g., determining, establishing, selecting) the first orientation relative to a reference (e.g., reference point, a second orientation) such that the plurality of wavelengths are focused at the same focal length.

In some embodiments, the method may include determining (e.g., identifying, fabricating, selecting, establishing, forming) a shape of each of the first plurality of nanoscale elements. The method may include determining a shape of each of the second plurality of nanoscale elements. In some embodiments, the method may include determining (e.g., identifying, optimizing, selecting, establishing) a rotation of each of the first plurality of nanoscale elements. The method may include determining a rotation of each of the second plurality of nanoscale elements. In some embodiments, the method may include determining a physical distribution of the first plurality of nanoscale elements. The method may include determining (e.g., identifying, selecting, establishing, forming, optimizing) a physical distribution of the second plurality of nanoscale elements.

Another aspect of the present disclosure is directed to an augmented reality device. The augmented reality device may include a first zone (e.g., of a metalens portion of the augmented reality device). The first zone may include or have a first plurality of nanoscale elements. The first plurality of nanoscale elements may include or have a first optical dispersion profile and/or a first orientation. The augmented reality device may include a second zone (e.g., of the metalens portion). The second zone may include or have a second plurality of nanoscale elements. The second plurality of nanoscale elements may include or have a second optical dispersion profile and/or a second orientation. The augmented reality device may have a waveguide (e.g., scanning fiber device) for transmitting augmented reality information to the first zone and/or the second zone. The first orientation and/or the second orientation are determined based on constructive interference for a plurality of wavelengths and/or a focal length.

In some embodiments, the augmented reality device can include a third zone including a third plurality of nanoscale elements. The third plurality of nanoscale elements can have a third optical dispersion profile and a third orientation. The third orientation can be configured according to constructive interference at the plurality of wavelengths and the focal length. In some embodiments, the first orientation, the second orientation, and the third orientation are configured according to constructive interference for at least a first wavelength, a second wavelength, a third wavelength, and the focal length.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device, comprising:
a first zone comprising a first plurality of nanoscale elements, wherein the first plurality of nanoscale elements has a first optical dispersion profile and a first orientation; and
a second zone comprising a second plurality of nanoscale elements, wherein the second plurality of nanoscale elements has a second optical dispersion profile and a second orientation;
wherein the first orientation and the second orientation are configured according to constructive interference for a plurality of wavelengths and a focal length, and
wherein the first orientation and the second orientation are configured according to constructive interference for at least a first wavelength and a second wavelength.

2. The optical device of claim 1, further comprising:
a third zone comprising a third plurality of nanoscale elements, wherein the third plurality of nanoscale elements has a third optical dispersion profile and a third orientation;
wherein the third orientation is configured according to constructive interference at the plurality of wavelengths and the focal length.

3. The optical device of claim 1, further comprising:
a third zone comprising a third plurality of nanoscale elements, wherein the third plurality of nanoscale elements has a third optical dispersion profile and a third orientation;
wherein the first orientation, the second orientation, and the third orientation are configured according to constructive interference for at least the first wavelength, the second wavelength, a third wavelength, and the focal length.

4. The optical device of claim 1, wherein:
the first optical dispersion profile depends on a shape of each of the first plurality of nanoscale elements; and
the second optical dispersion profile depends on a shape of each of the second plurality of nanoscale elements.

5. The optical device of claim 1, wherein:
the first plurality of nanoscale elements has a first phase profile; and
the second plurality of nanoscale elements has a second phase profile;
wherein the first phase profile depends on a rotation of each of the first plurality of nanoscale elements; and
wherein the second phase profile depends on a rotation of each of the second plurality of nanoscale elements.

6. The optical device of claim 1, wherein:
the first plurality of nanoscale elements has a first phase profile; and
the second plurality of nanoscale elements has a second phase profile;
wherein the first phase profile depends on a shape of each of the first plurality of nanoscale elements; and
wherein the second phase profile depends on a shape of each of the second plurality of nanoscale elements.

7. The optical device of claim 1, wherein:
the first optical dispersion profile depends on a physical distribution of the first plurality of nanoscale elements; and
the second optical dispersion profile depends on a physical distribution of the second plurality of nanoscale elements.

8. The optical device of claim 1, wherein a shape of the first zone is different from a shape of the second zone.

9. The optical device of claim 1, wherein the first zone and the second zone are concentric rings.

10. The optical device of claim 1, wherein the first plurality of nanoscale elements comprise at least one of titanium dioxide, silicon nitride, a polymer, an oxide, a nitride, a sulfide, a pure element, or a combination thereof.

11. The optical device of claim 1, wherein the first plurality of nanoscale elements includes nanopillars.

12. The optical device of claim 1, further comprising:
a transmissive substrate comprising glass or polymer, the first plurality of nanoscale elements and the second plurality of nanoscale elements disposed on the transmissive substrate.

13. A method of manufacturing an optical device, comprising:
disposing a first plurality of nanoscale elements in a first zone, wherein the first plurality of nanoscale elements has a first optical dispersion profile and a first orientation;
disposing a second plurality of nanoscale elements in a second zone, wherein the second plurality of nanoscale elements has a second optical dispersion profile and a second orientation; and
determining the first orientation and the second orientation based on constructive interference for a plurality of wavelengths and a focal length,
wherein the first orientation and the second orientation are configured according to constructive interference for at least a first wavelength and a second wavelength.

14. The method of claim 13, further comprising:
determining a shape of each of the first plurality of nanoscale elements; and
determining a shape of each of the second plurality of nanoscale elements.

15. The method of claim 13, further comprising:
determining a rotation of each of the first plurality of nanoscale elements; and
determining a rotation of each of the second plurality of nanoscale elements.

16. The method of claim 13, further comprising:
determining a physical distribution of the first plurality of nanoscale elements; and
determining a physical distribution of the second plurality of nanoscale elements.

17. An augmented reality device, comprising:
- a first zone comprising a first plurality of nanoscale elements, wherein the first plurality of nanoscale elements has a first optical dispersion profile and a first orientation;
- a second zone comprising a second plurality of nanoscale elements, wherein the second plurality of nanoscale elements has a second optical dispersion profile and a second orientation; and
- a waveguide for transmitting augmented reality information to the first zone and the second zone;
- wherein the first orientation and the second orientation are determined based on constructive interference for a plurality of wavelengths and a focal length.

18. The augmented reality device of claim 17, further comprising:
- a third zone comprising a third plurality of nanoscale elements, wherein the third plurality of nanoscale elements has a third optical dispersion profile and a third orientation;
- wherein the third orientation is configured according to constructive interference at the plurality of wavelengths and the focal length.

19. The augmented reality device of claim 17, further comprising:
- a third zone comprising a third plurality of nanoscale elements, wherein the third plurality of nanoscale elements has a third optical dispersion profile and a third orientation;
- wherein the first orientation, the second orientation, and the third orientation are configured according to constructive interference for at least the first wavelength, the second wavelength, a third wavelength, and the focal length.

* * * * *